United States Patent
Swirsky et al.

(10) Patent No.: US 9,730,023 B2
(45) Date of Patent: Aug. 8, 2017

(54) COMMUNICATION BASED ON GEOGRAPHICAL REGION

(71) Applicant: Chatterbeak, Inc., Sunnyvale, CA (US)

(72) Inventors: Robert Alan Swirsky, Sunnyvale, CA (US); Roger B. Spreen, Los Altos Hills, CA (US)

(73) Assignee: Chatterbeak, Inc., Sunnyvale, CA (US)

( * ) Notice: Subject to any disclaimer, the term of this patent is extended or adjusted under 35 U.S.C. 154(b) by 45 days.

(21) Appl. No.: 14/924,074

(22) Filed: Oct. 27, 2015

(65) Prior Publication Data

US 2017/0118597 A1    Apr. 27, 2017

(51) Int. Cl.
| | | |
|---|---|---|
| *H04W 24/00* | (2009.01) | |
| *H04W 4/02* | (2009.01) | |
| *H04W 76/02* | (2009.01) | |
| *G06F 3/16* | (2006.01) | |

(52) U.S. Cl.
CPC ............ *H04W 4/027* (2013.01); *G06F 3/165* (2013.01); *H04W 76/02* (2013.01)

(58) Field of Classification Search
CPC ........ H04W 4/027; H04W 76/02; G06F 3/165
USPC ......... 455/456.1, 456.2, 456.3, 456.4, 456.5, 455/456.6, 457
See application file for complete search history.

(56) References Cited

U.S. PATENT DOCUMENTS

| | | | |
|---|---|---|---|
| 6,404,872 B1 | 6/2002 | Goldberg et al. | |
| 7,626,951 B2 | 12/2009 | Croy et al. | |
| 8,606,297 B1 | 12/2013 | Simkhai et al. | |
| 8,948,804 B2 | 2/2015 | Lee et al. | |
| 9,049,537 B2 | 6/2015 | Shalunov et al. | |
| 2007/0171898 A1 | 7/2007 | Salva | |
| 2008/0004038 A1 | 1/2008 | Dunko | |
| 2014/0087761 A1 | 3/2014 | Baskin et al. | |
| 2014/0303966 A1* | 10/2014 | Adachi | H04M 1/6075 704/201 |

OTHER PUBLICATIONS

BR8KER—The CB Radio for the 21st century on the App Store on iTunes, Sungod LLC, iTunes Preview, accessed on Jul. 30, 2015, https://itunes.apple.com/us/app/br8ker/id546350713.
CB Radio Chat—Description, CB Radio Chat, Accessed on Jul. 27, 2015, http://www.cbradiochat.net/.

(Continued)

*Primary Examiner* — Shahriar Behnamian
(74) *Attorney, Agent, or Firm* — The Mueller Law Office, P.C.

(57) ABSTRACT

In some embodiments, a server establishes communication with user devices; the server receives location data identifying a location of each user device; the server determines a geographical region based on the location of each user device, each geographical region being different for user devices not at the same location; the server receives an audio stream from the first of the user devices; the server determines which of the other user devices are within the geographical region of the first user device; and the server transmits the audio stream to the other user devices that are within the geographical region of the first user device. In some embodiments, the server creates altered audio streams based on the distances between user devices. In some embodiments, the server changes the number of the other user devices that are within the geographical region of the first user device.

16 Claims, 10 Drawing Sheets

(56) References Cited

OTHER PUBLICATIONS

CB Radio Chat—Gallery, CB Radio Chat, accessed on Jul. 27, 2015, http://www.cbradiochat.net/.
CB Radio Chat—Pro Version,CB Radio Chat, Accessed on Jul. 27, 2015, http://www.cbradiochat.net/.
CB Radio Chat—Recent Features, CB Radio Chat, Accessed on Jul. 27, 2015, http://www.cbradiochat.net/.
CB Simulator, Wikipedia, Accessed on Jul. 27,2015, https://en.wikipedia.org/wiki/CB_Simulator.
CeeBee—The Walkie Talkie Evolved, Ceebee, Accessed on Jul. 28, 2015, http://www.ceebee.me/.
CeeBee—Walkie Talkie Free for Android, CNET Download, accessed on Jul. 27, 2015, http://download.cnet.com/CeeBee-Walkie-Talkie-FREE/3000-10440_4-75754728.html.
CellPtt—PTT Walkie Talkie, Google Play, Accessed on Jul. 27, 2015, https://play.google.com/store/apps/details?id=com.adcom.cellpttv2.
Crescenzi, A Location Sensitive CB Radio App, Idea of the Day Blog, Jul. 5, 2015, accessed on Jul. 27, 2015, http://www.ideaoftheday.com/Blog/article.aspx?p=384.
FireChat, Google Play, Accessed on Jul. 27, 2015, https://play.google.com/store/apps/details?id=com.opengarden.firechat&hl=en.
Messieh, How to Use Push-to-Talk on the iPhone for Free, Make Use of, Apr. 10, 2010, Accessed on Jul. 27, 2015, http://www.makeuseof.com/tag/pushtotalkiphonefree/.
Neate, Welcome to Blendr, the Straight Dating App Following in Grindr's Footsteps, The Guardian, Sep. 12, 2011, Accessed on Jul. 27, 2015, http://www.theguardian.com/technology/2011/sep/12/blendrstraightdatingappgrindr.
Rowinski, 5 Push-to-Talk Apps That Turn Your Smartphone Into a Walkie-Talkie, Readwrite, May 23, 2012, accessed on Jul. 27, 2015, http://readwrite.com/2012/05/23/5pushtotalkappsthat-turnyoursmartphoneintoawalkietalkie.
Shander, HamSphere Virtual Ham Radio on Mobile Devices, Broadcasters' Desktop Resource, Sep. 25, 2013, Accessed on Jul. 27, 2015, http://www.thebdr.net/articles/ops/test/HamSphere.pdf.
Sprint Direct Connect Now, Google Play, Accessed on Jul. 27, 2015, https://play.google.com/store/apps/details?id=com.qualcomm.qchat.dla&hl=en.
Stay Connected to the People that Matter, Life 360, Accessed on Jul. 28, 2015, https://www.life360.com/tour/.
TiKL Touch Talk Walkie Takie, Google Play, Accessed on Jul. 27, 2015, https://play.google.com/store/apps/details?id=mobi.androidcloud.app.ptt.client.
Virtual Walkie Talkie, AndroIX, accessed on Jul. 27, 2015, http://www.androix.com/apps/virtualwalkietalkie/.
Yik Yak, Wikipedia, accessed on Jul. 27, 2015, https://en.wikipedia.org/wiki/Yik_Yak.
Zello Walkie Talkie App, Zello, Accessed on Jul. 27, 2015, https://zello.com/app.

\* cited by examiner

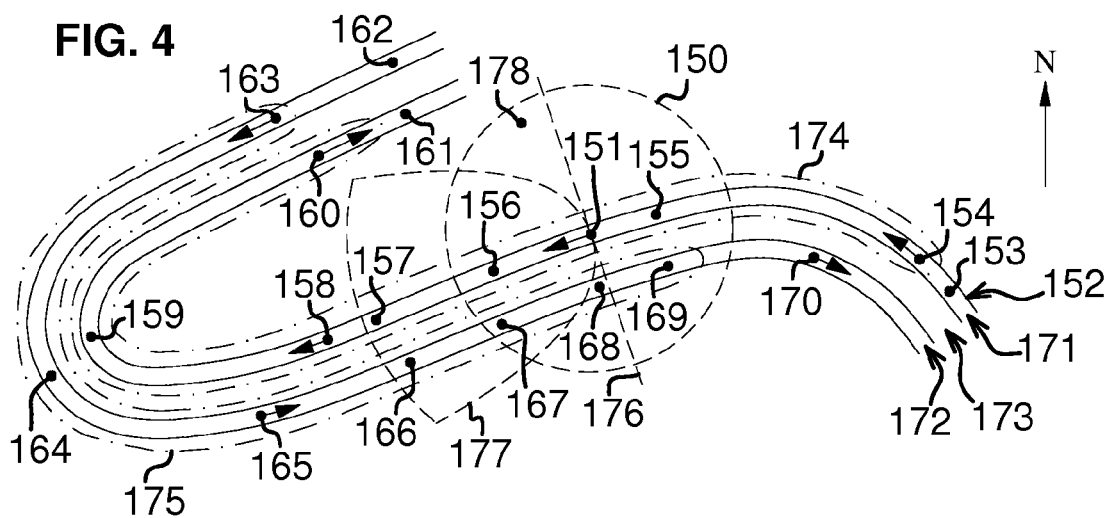
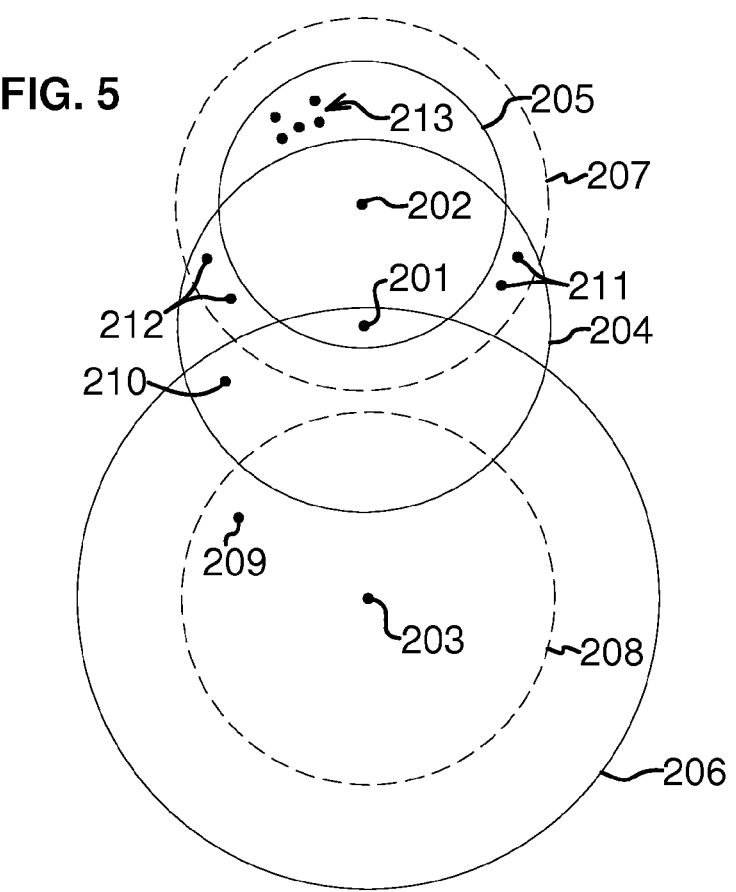

COMMUNICATION BASED ON GEOGRAPHICAL REGION

BACKGROUND

There are a variety of different applications or techniques for audio (and sometimes video) communication between two or more people using computerized devices. Cell phones, for example, may be used, not only to place conventional telephone calls to land-line phones or other cell phones, but also to establish audio communication sessions via 3G, 4G or WiFi data communication capabilities, e.g., of a smart phone. Desktop, notebook and tablet computers with a data network connection may also be used for similar data communication audio sessions, including group conferencing, using services such as Skype™, WebEx™, GoToMeeting™, Sococo™, etc.

Some smart phone based audio communication applications, e.g., BR8KER™, HamSphere™, CB Radio Chat™, CeeBee™, CellPtt™, VirtualWalkieTalkie™, TiKL™, and others, attempt to simulate old-fashioned or analog two-way radio communication through the data communication capabilities of smart phones. By default, such radio simulation applications typically mute the microphone, so the user can simply listen to other people without participating until it is desired to do so. The radio simulation applications, thus, typically have a push-to-talk feature to simulate the conventional half-duplex CB (Citizens Band) radio, walkie-talkie or ham radio function that requires a user to push a button in order to talk into a microphone. In this manner, a radio-like "feel" is achieved for the user's experience. However, the radio simulation applications generally have various restrictive features that adversely impact the radio-like feel of the user experience.

SUMMARY

In some embodiments, a method comprises establishing, by a server, communication with user devices, the user devices including a first user device and other user devices; for each user device, receiving, by the server, location data identifying a location of that user device; for each user device, determining, by the server, a geographical region based on the location of that user device, each geographical region being different for user devices not at the same location; receiving, by the server, an audio stream from the first user device; determining, by the server, which of the other user devices are within the geographical region of the first user device; and transmitting, by the server, the audio stream to the other user devices that are within the geographical region of the first user device.

In some embodiments, the server determines the geographical region for each user device with the user device at a center of the geographical region. In some embodiments, the server determines the geographical region for each user device with the geographical region having boundaries based on geographical features. In some embodiments, the server repeatedly determines the geographical region for each user device, so that the geographical region changes as that user device changes location; and the server repeatedly determines a set of the other user devices that are within the geographical region of the first user device, so that the set of the other user devices changes as the geographical region of the first user device changes. In some embodiments, for each first user device with a changing location, the server determines a group of user devices based on i) the geographical region of that user device, and ii) a history of locations of that user device; and the server transmits the audio stream to the other user devices that are within the group of user devices for the first user device. In some embodiments, for each user device for which the history of locations indicates that it is moving, the group of user devices is further based on a direction of movement of the user device. In some embodiments, for each user device that is moving, the group of user devices is further based on a direction of movement of the other user devices. In some embodiments, for each user device that is moving, the group of user devices is further based on a direction of movement of the other user devices relative to the direction of movement of that user device. In some embodiments, for each user device that is moving, the group of user devices is further based on a direction of movement of that user device and of the other user devices relative to a geographical feature. In some embodiments, for each user device for which the history of locations indicates that it is moving, the group of user devices is further based on a speed of movement of that user device. In some embodiments, for each user device, the server determines a group of user devices based on i) the geographical region of that user device, and ii) that user device and a set of the user devices travelling on a same route; and the server transmits the audio stream to the other user devices that are within the group of user devices for the first user device. In some embodiments, for each user device, the server determines a group of user devices based on the geographical region of that user device, the other user devices that are within the geographical region of that user device being a subset of the other user devices, the subset of the other user devices being in the group of user devices for that user device, and that user device being in the groups of user devices for the subset of the other user devices; and for each user device, the server transmits audio streams received from that user device to the other user devices that are in the group of user devices for that user device. In some embodiments, the server transmits the audio stream to the other user devices that are within the geographical region of the first user device in near real-time.

In some embodiments, a method comprises establishing, by a server, communication with user devices, the user devices including a first user device and a second user device; for each user device, receiving, by the server, location data identifying a location of that user device; receiving, by the server, a first audio stream from the first user device; determining, by the server, a distance between the first user device and the second user device based on the location data for the first user device and the location data for the second user device; creating, by the server, an altered audio stream from the first audio stream based on the distance between the first user device and the second user device; and transmitting, by the server, the altered audio stream to the second user device. In some embodiments, the server creates the altered audio stream by at least one of: a) applying a computed transformation to the audio stream, and b) mixing the audio stream with a sound.

In some embodiments, a method comprises establishing, by a server, communication with user devices, the user devices including a first user device and other user devices; for each user device, receiving, by the server, location data identifying a location of that user device; for each user device, determining, by the server, a geographical region based on the location of that user device, the geographical region having an area; for each user device, determining, by the server, the other user devices that are within the geographical region of that user device; receiving, by the server, audio streams from at least one of the other user devices that are within the geographical region of the first user device;

transmitting, by the server, the audio streams to the first user device; and changing, by the server, a number of the other user devices that are within the geographical region of the first user device by changing the area of the geographical region. In some embodiments, changing the number of the other user devices that are within the geographical region of the first user device includes at least one of: 1) decreasing, by the server, the number of the other user devices that are within the geographical region of the first user device by decreasing the area of the geographical region, and 2) increasing, by the server, the number of the other user devices that are within the geographical region of the first user device by increasing the area of the geographical region. In some embodiments, the decreasing of the area of the geographical region decreases a radius of the geographical region; and the increasing of the area of the geographical region increases a radius of the geographical region. In some embodiments, the decreasing of the area of the geographical region is in response to the number of the other user devices that are within the geographical region of the first user device being above a maximum threshold; and the increasing of the area of the geographical region is in response to the number of the other user devices that are within the geographical region of the first user device being below a minimum threshold. In some embodiments, the changing of the area of the geographical region is based on a level of communication traffic for audio streams received from the other user devices.

BRIEF DESCRIPTION OF THE DRAWINGS

FIGS. 3-9 are simplified drawings illustrating various functions of the radio simulation system shown in FIG. 1 in accordance with various embodiments of the present invention.

DETAILED DESCRIPTION

Figure 1:
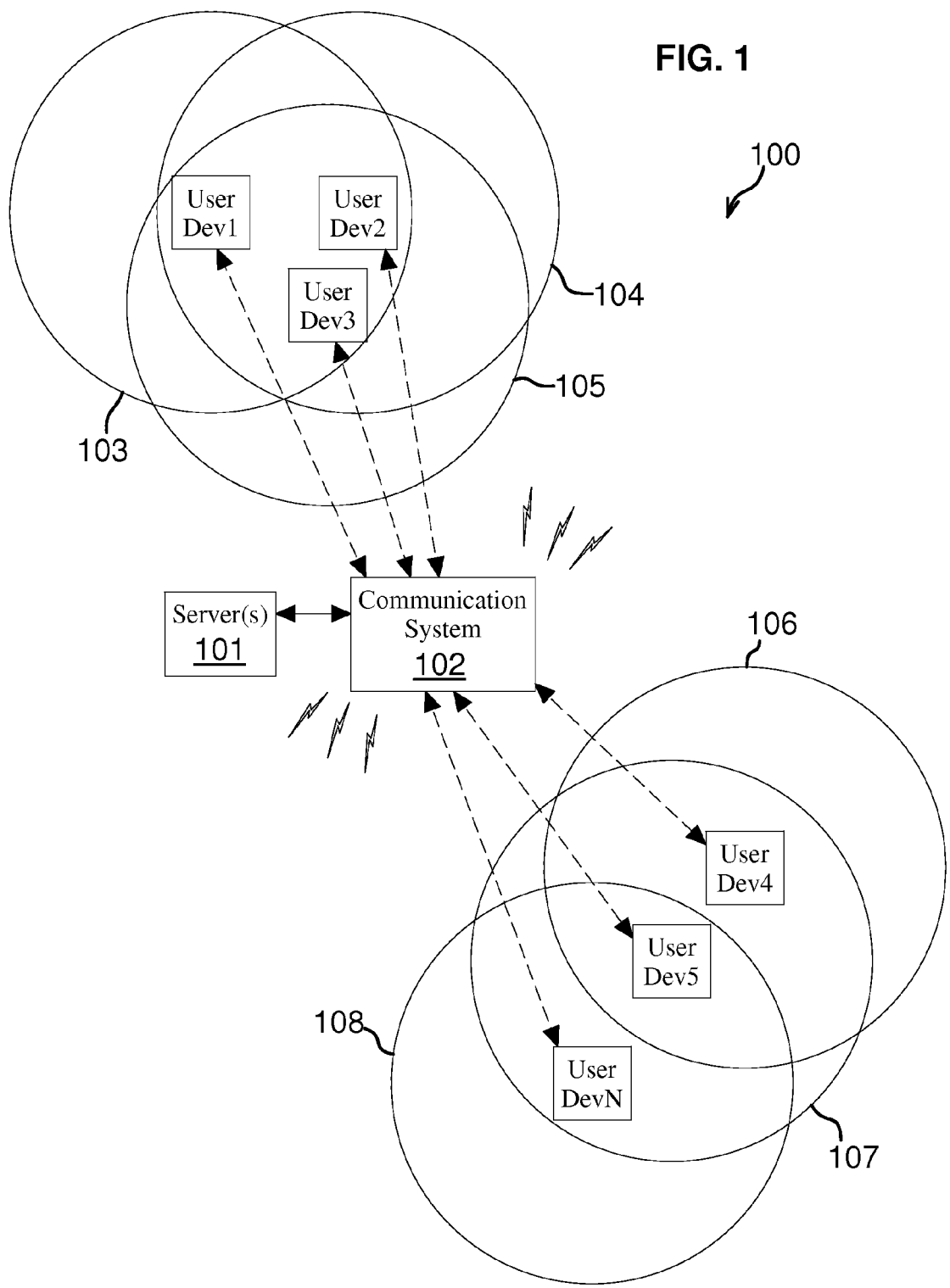
FIG. 1 is a simplified schematic drawing of a radio simulation system incorporating an embodiment of the present invention.

According to some embodiments, as shown in FIG. 1, a radio simulation system 100 generally includes one or more server(s) 101 in communication with N user devices Dev1-DevN through a communication system 102. Users of the user devices Dev1-DevN generally communicate with some of the other users (through the server 101) in a manner that, in some embodiments, gives a simulated look and feel of real-time communication through a two-way radio, such as point-to-point simplex communication between CB (citizens band) radios or walkie-talkies, as described below.

The user devices Dev1-DevN represent various types of personal computerized devices (running a two-way radio simulation client/application with functions described herein), such as smart phones (e.g., Android™, iPhone™, etc.), mobile digital devices, tablet computers, notebook computers, desktop computers, game consoles, embedded computers (e.g., in vehicles), etc. or an application-specific electronic client device (having digital and analog circuitry for performing the two-way radio simulation functions described herein). The servers 101 represent one or more stand-alone computer devices or multiple distributed-computing devices, such as in a server farm or a cloud computing system, running a server application(s) with functions described herein. The communication system 102 represents a variety of wired and wireless communication networking devices for cell phone (3G, 4G, etc.) data communications, Internet transmissions (e.g., in an IP network), WiFi connections, etc.

To simulate the two-way radio communication, a communication connection is established between the server 101 and the user devices Dev1-DevN through the communication system 102. For embodiments in which the user devices Dev1-DevN are smart phones, for example, the two-way radio simulation application has access to the data communication capabilities thereof, e.g., 3G or 4G cell phone communications, WiFi™, Bluetooth™, Zigbee™, WiMax™, other wireless connection, or a wired Ethernet or other wired link layer connection, etc., in order to establish the communication connection. The users then speak into a microphone of the user devices Dev1-DevN, and audio data is streamed to the server 101, which retransmits the audio streams to selected other user devices Dev1-DevN. The user devices Dev1-DevN also transmit location data (e.g., generated by GPS or other location-determining sensor components and functions of the user devices Dev1-DevN) identifying their individual locations to the server 101.

The server 101 determines geographical regions 103-108 that correspond to the user devices Dev1-DevN, respectively, based on (or centered on) the location of each user device Dev1-DevN. In some embodiments, each geographical region 103-108 is different for each user device Dev1-DevN, since the location of each user device Dev1-DevN is typically different from every other user device Dev1-DevN. If two or more of the user devices Dev1-DevN are directly on top of one another so that they generally share the same location, however, then the geographical regions 103-108 for those devices may be the same. Additionally, although the geographical regions 103-108 are shown as circular, other embodiments can use other shapes, even with non-contiguous portions thereof, thereby simulating various radiation patterns produced by conventional two-way radios, as well as other patterns that would not occur in the physical world.

Upon receiving the audio stream transmitted from one of the user devices Dev1-DevN, the server 101 determines which of the other user devices Dev1-DevN are physically within the geographical region 103-108 of the user device Dev1-DevN that is transmitting the audio stream. The server 101 then retransmits (e.g., on a per audio frame basis) the audio stream to the other user devices Dev1-DevN that are physically within that geographical region 103-108, so that those user devices Dev1-DevN receive the audio stream in real-time, or almost in real-time, i.e., with as little delay as possible or practical for a "near real time" or "soft real time" experience. Real-time audio generally has tight time constraints in which all the audio data must be transformed, transported, and untransformed at the recipient's station with a minimum of delay to create the natural feel of a conversation. In some embodiments, therefore, retransmission starts immediately, i.e., as quickly as possible or practical, upon beginning to receive the audio stream. The other user devices Dev1-DevN receive the audio stream and then present it to the users through speakers, headphones, earbuds, or other appropriate listening devices.

For example, if the server 101 receives an audio stream from one of the user devices Dev1-Dev3, then the server 101 retransmits the audio stream to the other ones of the user devices Dev1-Dev3, since all of the user devices Dev1-Dev3 are within the geographical regions 103-105 of each other. Consequently, since the user devices Dev4-DevN are not within the geographical regions 103-105 of the user devices Dev1-Dev3, the audio stream is not retransmitted to those user devices Dev4-DevN. Similarly, if the user device Dev5 transmits an audio stream, the server 101 retransmits it to both of the user devices Dev4 and DevN, since both are within the geographical region 107 of the user device Dev5, and not to the user devices Dev1-Dev3, since none of them are within the geographical region 107. If either user device Dev4 or DevN transmits an audio stream, however, the server 101 retransmits it only to the user device Dev5, since only the user device Dev5 is within the geographical regions 106 and 108 of the user devices Dev4 and DevN. Each user device Dev4 or DevN is not within the geographical region 108 or 106 of the other, so they do not receive each other's audio streams.

In other words, in some embodiments, the radio simulation system 100 allows each user device Dev1-DevN to receive only the audio streams from other user devices Dev1-DevN that are within a certain permissible range. In this manner, the user devices Dev1-DevN simulate the look and feel of a conventional CB radio or walkie-talkie, in some embodiments, wherein communication between radios is limited by broadcast range (corresponding to the geographical regions 103-108, regardless of their shape). This feature and additional features described below improve the functioning of the server 101 and the user devices Dev1-DevN by enabling rapid, simple ways to establish voice communications by people within a certain distance of each other or in a certain special or physical relationship relative to each other by means of a simulated two-way radio communication. In some embodiments described below, the physical relationship may be a present relationship, as well as a past relationship. Additionally, these features are improvements in telecommunication technology that enable enjoyment of a retro or nostalgic experience and variations thereof described below enabled by modern or computer technology by means of the simulated two-way radio communication.

In some embodiments, the communication connection between the server 101 and each user device Dev1-DevN is established upon turning on the user device Dev1-DevN or upon launching a two-way radio simulation application on the user device Dev1-DevN by the user. In some embodiments, the communication connection is established by the user selecting a function within the application on the user device Dev1-DevN, e.g., by pressing a button or touching or clicking on a display screen icon. The communication connection is generally established by the user device Dev1-DevN generating and sending a data packet (identifying the user device Dev1-DevN) through the communication system 102 to the server 101, followed by the server 101 receiving and parsing the data packet and activating a communication session with the user device Dev1-DevN.

The first time a user device Dev1-DevN establishes the communication connection, in some embodiments, the user registers the user device Dev1-DevN with the server 101 (and supporting services running on the server 101). In some embodiments, the user provides a username and password and/or an identifier or other type of unique identity (ID) code, which are stored by the server 101. Alternatively, the server 101 provides the unique ID codes to the user devices Dev1-DevN. In some embodiments, both the username and some type of unique ID code are used for different purposes within the radio simulation system 100. The username and password or other type of unique ID code, for example, is used by the user devices Dev1-DevN to login to the server 101 upon establishing the communication connection in the future. The future login procedure may be done automatically upon establishing the communication connection. Additionally, in some embodiments, the username, which is not necessarily unique, serves to identify the user to other users, in some embodiments, in a manner similar to the practice among CB operators or other radio operators of identifying themselves with a "handle" or "radio call sign," instead of with their real name.

In other embodiments, there is no need for registering upon initially establishing the communication connection. Instead, the server 101 and the user devices Dev1-DevN automatically allow the users to immediately begin participating in conversations (listening and speaking) with other users (with other user devices Dev1-DevN within the appropriate geographical region 103-108) as soon as the communication connection is established. In this manner, or in the manner of the automatic login described previously, the server 101 and the user devices Dev1-DevN operate together to further simulate, in some embodiments, the look and feel of a two-way radio communication, wherein communication capabilities are established almost immediately upon turning on the two-way radio. In other embodiments, the communication capabilities between the user devices Dev1-DevN are not enabled until the users activate the communication feature in the two-way radio simulation application, e.g., by pressing a button or touching or clicking on a display screen icon.

In some embodiments, immediately upon establishing the communication connection (with or without registration and/or login), the user devices Dev1-DevN transmit the location data (e.g., in a data packet) identifying their location to the server 101. This feature enables the server 101 to determine (e.g., by receiving and parsing the data packet and processing the location data) the geographical regions 103-108 for each user device Dev1-DevN as soon as possible, so that communications between the user devices Dev1-DevN (within each other's geographical regions 103-108) can begin almost immediately or upon being activated by the users. In other embodiments, the user devices Dev1-DevN do not transmit their location data to the server 101 until the user causes it to happen, e.g., by pressing a button or touching or clicking on a display screen icon. In either case, a communication "session," i.e., with a defined beginning and end, is not established. Instead, communication is "sessionless," i.e., communication is always available between user devices Dev1-DevN that are within each other's range or geographical regions 103-108.

In some embodiments, the server 101 establishes various groups of the user devices Dev1-DevN. In some embodiments, the groups are established without inviting the user devices Dev1-DevN to join the groups. The groups are generally based on the locations and/or the geographical regions 103-108 of the user devices Dev1-DevN. Each user device Dev1-DevN, in some embodiments, is associated with and is a member of its own group, and each of the other user devices Dev1-DevN that is physically within the geographical region 103-108 of that user device Dev1-DevN is also a member of that group. Thus, in some embodiments, each group is considered to have a primary member (one of the user devices Dev1-DevN on which the group is based or centered) and one or more secondary members (one or more of the other user devices Dev1-DevN physically within the geographical region 103-108 of the primary member user device Dev1-DevN). Similarly, each user device Dev1-DevN is considered, in some embodiments, as a sole primary member of its own group and as a secondary member of one or more other groups. The server 101 stores and maintains group association data for each of the user devices Dev1-DevN. When the server 101 receives an audio stream transmission from one of the user devices Dev1-DevN, therefore, it retransmits the audio stream to the other members of the group for that user device Dev1-DevN.

In some embodiments, the look and feel of two-way radio communication is further simulated by requiring the user to activate the microphone or data transmission of the user device Dev1-DevN before the audio stream can be transmitted therefrom to the server 101. For some embodiments in which the user device Dev1-DevN is a smart phone, a tablet computer or other touch-input device, for example, the user touches or presses a display screen icon to activate this feature. In some embodiments, a button or key is pressed on the user device Dev1-DevN, or a pointing device is used to click on an icon. In some embodiments, this feature may be voice or sound activated, wherein the microphone is always activated, but the audio stream transmission is not until, for example, the user speaks into the microphone or speaks a particular keyword detected by a voice recognition application. Additionally, the microphone or data transmission is deactivated when the user stops touching the display screen icon or pressing the button/key, when the user touches or presses another icon/button/key, when the user says another particular keyword (e.g., "over") detected by the voice recognition application, or after a period of silence in which the user does not speak. This feature simulates the push-to-talk (PTT) function of a two-way radio, wherein the radio operator must press a button on the radio or microphone in order to transmit audio and releases the button when finished.

In some embodiments, if more than one user device Dev1-DevN is transmitting an audio stream for receipt by the same other user devices Dev1-DevN, then the server 101 combines or merges each of the individual audio streams into a single overall unified audio stream before retransmitting. For example, if both user devices Dev1 and Dev2 are transmitting an audio stream, then the server 101 merges those audio streams into the unified audio stream for transmitting to the user device Dev3. The user of the user device Dev3, therefore, hears both of the other users speaking simultaneously. On the other hand, if the user devices Dev4 and Dev5 are simultaneously transmitting audio streams, then a user device that is within both of the geographical regions 106 and 107 will receive both audio transmissions, but the user device DevN will receive only the one from the user device Dev5. This feature may be confusing to the receiving user, but it simulates the ability of two-way radios to receive transmissions from multiple overlapping transmitters. In some embodiments, to reduce computational overhead, user devices that are coincident or within a certain distance of each other may have all of their audio streams computed together as one user device, such that a mixed signal calculation is shared across these user devices.

As an alternative, in some embodiments, the first audio stream to reach the server 101 is retransmitted to those user devices Dev1-DevN that are supposed to receive it, and when a subsequent audio stream is received from another user device Dev1-DevN while the first audio stream is being retransmitted, the subsequent audio stream is not retransmitted to those user devices Dev1-DevN that are already receiving the first audio stream. Instead, audio data packets for the subsequent audio stream are retransmitted only to any of the user devices Dev1-DevN that are not already receiving an audio stream. Otherwise, the audio data packets are dumped or deleted, until the first audio stream stops. When the first audio stream stops, then the subsequent audio stream, if it is still being received by the server 101, is retransmitted at that point within the second audio stream to those user devices Dev1-DevN that had been receiving the first audio stream. This feature prevents confusing overlapping audio streams. However, this feature also causes some of the user devices Dev1-DevN to potentially miss some audio streams or portions of some audio streams. Alternatively, in some embodiments, in order to avoid overlapping audio streams, a user device (e.g., Dev1) is prevented from transmitting when another user device (e.g., Dev2) within range is transmitting. For example, an audible error signal (e.g., a beep) or a display screen pop-up message is presented to the user of the user device Dev1 when the user activates the microphone or data transmission at a time when the other user device Dev2 is already transmitting.

In some embodiments, the user devices Dev1-DevN do not receive audio streams or present them to the users while also transmitting at the same time. In other words, the server 101 does not retransmit audio streams to the user devices Dev1-Dev4 from which it is receiving audio streams, or the user devices Dev1-DevN stop presenting audio streams through their speaker/earphone when their microphone or data transmission is activated. In this manner, the conventional feature of a typical two-way radio is simulated wherein the radio cannot receive while transmitting. In some embodiments, a receiving user may be alerted that it is clear to begin a response transmission by the server 101 or the user device Dev1-DevN adding an audible signal (e.g., a beep) at the end of every audio stream. Alternatively, users may develop the practice of always saying "over," as in conventional two-way radio usage.

In some embodiments, different channels (e.g., designated by a number or a name) are available for communication among user devices Dev1-DevN that are within the geographical regions 103-108 of each other. Users set their user devices Dev1-DevN to a desired one of the available channels. If one channel has too much audio traffic, for example, then some users can switch or set their user devices Dev1-DevN to another unused or less-used channel. In some embodiments, channels have a limit on the number of allowed user devices Dev1-DevN that can participate in it at a single time. This feature simulates the conventional feature of typical two-way radios wherein the radios can be tuned to different frequencies for simultaneous transmissions without interfering with each other. Upon starting the two-way radio simulation application, the user device Dev1-DevN defaults to the most recently used channel or to a designated default channel, or the application does not begin participating in a channel, until the user sets it. In some embodiments, therefore, the user devices Dev1-DevN that can communicate with each other is determined by the server 101 based on both the selected channel and the geographical area.

In some embodiments, users purchase or create private or premium channels. In some embodiments, the premium channels are in addition to the (public) channels that are available to every user device Dev1-DevN, but the premium channels are restricted to the user devices Dev1-DevN of the users that the channel purchaser/creator selects or invites or allows to join that channel. Such premium channels may be for private use or for special interest discussions among a select group of users. In some embodiments, premium channels are used just like public channels, but only for certain users, e.g., those that have paid for a subscription or monthly/recurring fee. In some embodiments, the private or premium channels have an expiration date and/or time.

In some embodiments, special channels (whether private/premium or free/publicly-available) are created for specific purposes. For example, a special channel can be created for an event, such as a sporting, political or concert event. In this case, when the user devices Dev1-DevN are within a geographical region of the event (e.g., inside a sports stadium's grounds), the user devices Dev1-DevN will show the availability of the special channel, and users select the special channel through their user devices Dev1-DevN in order to communicate with other users in attendance at the same event and who want to discuss that event without listening to users who are discussing other interests. In some embodiments, special channels created for an event will expire a certain time after the event ends.

In some embodiments, the user device Dev1-DevN is set to more than one channel at a time. For example, if multiple channels are available, but communication traffic is relatively light in some of the channels, the user can set the user device Dev1-DevN to more than one channel in order to increase the communication traffic to that user device Dev1-DevN.

In some embodiments, a special channel can be created in which only a specified subset of users (or user devices Dev1-DevN), who have certain requisite permissions, are allowed to transmit audio streams for that channel. Other users are allowed listen-only capabilities. For example, this feature may be used for a select group of users to provide information or commentary to a much larger group of people, such as for a special event (e.g., sporting, political, concert, county fair, etc.) or location-based information (e.g., for a museum, an airport, emergency management, etc.).

The private, premium or special channel features are variations on the two-way radio simulation concept made possible by computer technology. In other words, although these features are not exact simulations of conventional two-way radio communications, these features nevertheless make the experience of the look and feel more enjoyable, in some embodiments.

In some embodiments, users can block other users to whom they do not want to listen. To do so, since the server 101 merges all of the audio streams into a unified audio stream for each user device Dev1-DevN, the user causes the user device Dev1-DevN to transmit to the server 101 an indication of which user or other user device Dev1-DevN to block. In response, the server 101 no longer includes audio streams from the blocked user device Dev1-DevN in the unified audio stream for the user device Dev1-DevN that requested the block. In some embodiments, the blocked user device Dev1-DevN is flagged to not be included in the geographical region 103-108 or group for the block-requesting user device Dev1-DevN. Additionally, in some embodiments, the block-requesting user device Dev1-DevN is not included in the geographical region 103-108 or group for the blocked user device Dev1-DevN. Similarly, a creator of a private, premium or special channel can block selected user devices Dev1-DevN from joining those channels or from transmitting or receiving audio streams for those channels. The blocking features are additional variations on the two-way radio simulation concept made possible by computer technology. In other words, although these features are not exact simulations of conventional two-way radio communications, these features nevertheless make the experience of the look and feel more enjoyable, in some embodiments, by removing unwanted or annoying participants from a user's conversations.

In some embodiments, the length for any continuous audio stream from any of the user devices Dev1-DevN has a maximum allowable time limit or duration. A timeout thus occurs a certain amount of time after activating the microphone or data transmission, thereby ending the transmission. The user can then start another audio stream either immediately or after a "cool-down" period. This feature, although not similar to the conventional function of a typical two-way radio, prevents any one user from talking over other users and monopolizing the overall audio stream instead of actually having a conversation with the other users. Additionally, since some embodiments do not allow a user device Dev1-DevN to receive audio streams while transmitting, the timeout feature ensures that users have an opportunity to interrupt and respond to each other. When a user device Dev1-DevN is transmitting, an alert (e.g., a beep or pop-up message) that the timeout has occurred or is about to occur is provided to the user in some embodiments.

In some embodiments, the user devices Dev1-DevN re-determine or update their location data and transmit the new location data to the server 101. The location updates, in some embodiments, are performed at periodic intervals, e.g., with a fixed or variable time period. In some embodiments, the location updates are performed whenever an audio stream transmission begins. In some embodiments, the location updates are performed whenever the user devices Dev1-DevN detect movement thereof or a change in location of a certain distance amount.

Figure 2:
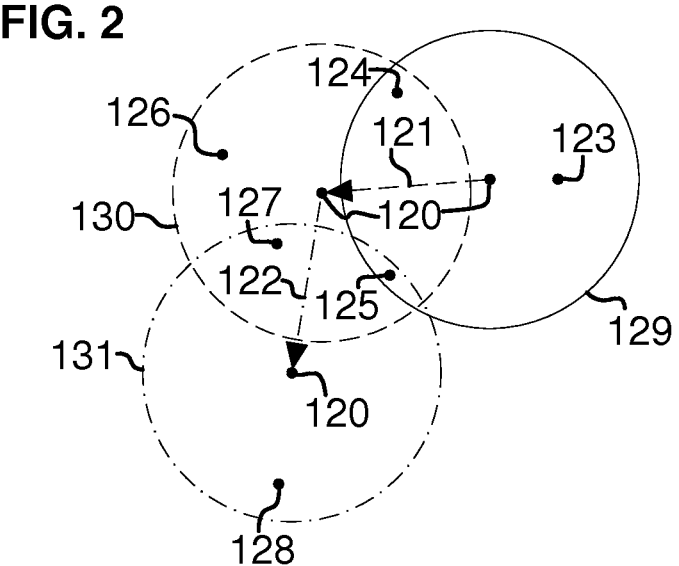
FIG. 2 is a simplified drawing illustrating a function of the radio simulation system shown in FIG. 1 in accordance with an embodiment of the present invention.

FIG. 2 shows an example situation in which a user or user device 120 moves (as indicated by arrows 121 and 122) among several other user devices 123-128. (In this and subsequent examples, the user devices are indicated by a dot.) The user device 120, therefore, repeatedly transmits updated location and/or vector (e.g., direction and/or speed) data to the server 101 at periodic intervals, when movement is detected, when the user device 120 transmits an audio stream or some combination thereof. Movement is detected by inertial sensors or by a change in GPS-type location data in the user device 120. In some embodiments, if the location data is transmitted at periodic intervals, the interval time length is shorter when the user device 120 is moving faster and longer when moving slower or not moving. In some embodiments, the update interval time length is short enough that the updates appear to occur almost continuously, or in real-time. In some embodiments, the update interval time length is on the order of one or more minutes. The updating of the location data is also done by the other user devices 123-128 in a similar manner.

When the server 101 receives the updated location data from the user device 120 (and the other user devices 123-128), the server 101 recalculates, re-determines, changes or updates the geographical region or group for the user device 120 (and the other user devices 123-128) as soon as possible, as needed or in almost real-time, based on a history of locations of the user device 120. For example, when the user device 120 transmits location and/or vector data at first, second and third locations, the server 101 determines geographical regions 129, 130 and 131, respectively, for the user device 120. (In some embodiments, the user device 120 also transmits its location data when it is between the first, second and third locations, depending on the length of time between updates.) When at the first location, only the other user devices 123-125 are within the geographical region 129 or group of the user device 120. When at the second location, on the other hand, only the other user devices 124-127 are within (and the user device 123 has become outside of) the geographical region 130 or group of the user device 120. By the time the user device 120 has reached the third location, only the other user devices 125, 127 and 128 are within (and the user devices 124 and 126 have become outside of) the geographical region 131 or group of the user device 120. In other words, as the user device 120 moves, different ones of the other user devices 123-128 become within range or within the group of the user device 120, while other ones become out of range or out of the group, as repeatedly determined by the server 101.

Although, for simplicity, this example shows only the user device 120 moving, similar changes to which of the other user devices 123-128 are within the geographical region 129-131 or group of the user device 120 occur when any of the other user devices 123-128 are moving (in addition to, or instead of, the user device 120). Additionally, the updating of which of the user devices 120 and 123-128 are within the geographical regions or groups for the other user devices 123-128 is done in a similar manner as any of the user devices 120 and 123-128 happen to move.

When the user device 120 transmits an audio stream as it is moving in the illustrated example, the server 101 repeatedly updates its determination of which of the other user devices 123-128 are to receive the retransmission of the audio stream. The redetermination of which user devices 123-128 receive the audio stream is done each time the user device 120 begins transmitting or at periodic intervals or prior to transmitting each audio frame in the overall audio stream. If a redetermination is done in the middle of an audio stream transmission from the user device 120, then some of the user devices 123-128 will start or stop receiving the audio stream at that middle point due to suddenly becoming within or outside of the geographical region 129-131 or group of the user device 120. Again, similar changes occur when any one of the other user devices 123-128 transmits an audio stream and the user device 120 moves into or out of the geographical regions or groups of the other user devices 123-128.

In other words, the user devices 120 and 123-128 that receive the audio streams from each other are dynamically updated as the user devices 120 and 123-128 move around. Similarly, in some embodiments, groups are established or created dynamically as the user devices 120 and 123-128 move around. This feature simulates the look and feel of conventional operation of two-way radio communications, in some embodiments, wherein moving radios move closer to or further away from other radios, thereby moving into or out of range of each other. This feature is also contrasted with other two-way radio simulation applications, wherein groups are not created and updated dynamically, but remain static and unchanging, except when users explicitly select to enter or leave a session or a group, such as a chat room.

Figure 3:
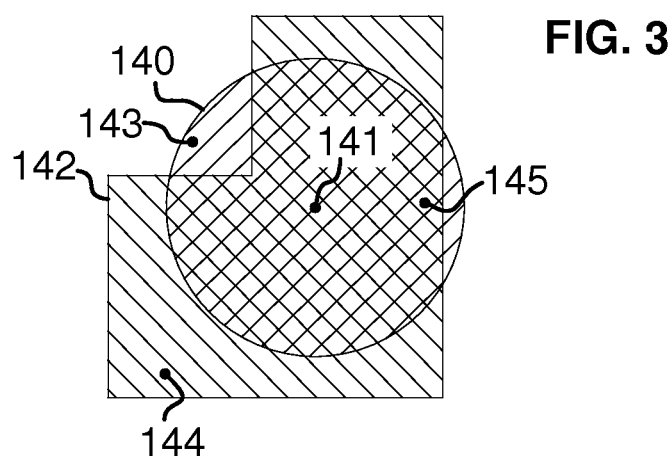

In some embodiments, as illustrated in FIG. 3, a geographical region 140 for a user device 141 is altered by the presence of an additional artificial boundary 142, e.g., a geofence. (In other embodiments described below, the geographical regions are altered by other heuristic filters, i.e., rules and criteria for including or excluding particular user devices from each other's geographical regions or groups.) In the illustrated example, there are three other user devices 143-145. The other user device 143 is inside only the geographical region 140, the other user device 144 is inside only the area of the artificial boundary 142, and the other user device 145 is inside both.

The artificial boundary 142 represents a fixed geographical area; whereas the geographical region 140 is dynamically moveable, as described above. In some embodiments, the user of the user device 141 can activate a feature that causes its geographical region 140 to be modified when the user device 141 enters the artificial boundary 142 or when the geographical region 140 and the artificial boundary 142 overlap. Alternatively, some establishments may require that the user device 141 be affected when entering their premises.

In some embodiments, the area enclosed by the artificial boundary 142 is "added" to the geographical region 140, so that the user device 141 communicates with all three of the other user devices 143-145, since they are inside either the artificial boundary 142 or the geographical region 140. This situation can occur when a user with the user device 141 enters a particular geographical area defined by the artificial boundary 142 and wants to communicate with other users within the artificial boundary 142, as well as with other users who are outside the artificial boundary 142, but still inside the regular geographical region 140 of the user device 141. For example, if the user enters a sports stadium for which the artificial boundary 142 has been set up during a game, then the user device 141 can communicate with any other user device inside the stadium, even if some parts of the stadium extend beyond the regular geographical region 140 of the user device 141. However, the user may still want to communicate with some other user outside the stadium, e.g., in the parking lot.

In some embodiments, the area enclosed by the artificial boundary 142 is "subtracted" from the geographical region 140, so that the user device 141 a) communicates with the other user device 143 that is inside the geographical region 140, b) does not communicate with the other user device 145 that is inside both the artificial boundary 142 and the geographical region 140, and c) does not communicate with the other user device 144 that is outside the geographical region 140. For example, a school administrator may decide that students should not be able to use the two-way radio simulation application inside a school. The school, represented by the artificial boundary 142, can be set up as a "dead zone" within which the server 101 does not allow any user devices 141, 144 and 145 to communicate with each other, but may still communicate with the user device 143 outside the school or artificial boundary 142. In some embodiments, however, the presence of the user device 141, 144 or 145 inside the dead zone of the artificial boundary 142 stops all communications through the two-way radio simulation application. In this case, the server 101 simply does not accept any audio streams from, nor allow any audio streams to be retransmitted to, any user devices 141, 144 and 145 that are inside the artificial boundary 142. Thus, the two-way radio simulation application does not work, even if the user device 141 attempts to communicate with the other user device 143 that is inside the geographical region 140, but outside the school or artificial boundary 142.

In some embodiments, the area enclosed by the artificial boundary 142 is "intersected" with the geographical region 140, so that the user device 141 a) communicates with the other user device 145 that is inside the overlapping area of the artificial boundary 142 and the geographical region 140, and b) does not communicate with the other user devices 143 and 144 that are outside the overlapping area. In this situation, opposite of the dead zone example above, when the user with the user device 141 enters the artificial boundary 142, the server 101 allows the user device 141 to communicate only with other user devices (e.g., 145) inside the artificial boundary 142. For example, an employer may not want its employees to communicate with other user devices (e.g., 143) outside the work environment (defined by the artificial boundary 142). Alternatively, a user inside a sports stadium may not want to communicate with users who are not also in attendance at the game. In some embodiments, when the user device 141 enters the artificial boundary 142, the artificial boundary 142 is not just intersected with the geographical region 140, but completely takes the place of the geographical region 140. In this case, the server 101 allows the user device 141 to communicate with any other user devices (e.g., 144 and 145) inside the artificial boundary 142, but not with any user devices (e.g., 143) outside the artificial boundary 142, even if inside the geographical region 140. Upon leaving the artificial boundary 142, the server 101 resets the user device 141 back to the regular geographical region 140. In this manner, the range of the user device 141 can be dynamically set by the server 101 back and forth between the artificial boundary 142 and the regular geographical region 140 upon entering and leaving the artificial boundary 142.

The artificial boundary embodiments described with reference to FIG. 3 do not exactly simulate the conventional operation of a two-way radio. Instead, these embodiments are additional variations on the two-way radio simulation concept made possible by computer technology and which enhance the enjoyment of the users of the user devices.

In some embodiments, a geographical region for a user device or a group of user devices (as determined by the server 101) is based on movement of the user devices relative to each other and/or relative to a geographical feature, as shown in an example in FIG. 4. In some cases, the server 101 alters or replaces a regular geographical region 150 for a user device 151 based on the presence of the user device 151 (e.g., as indicated by the location data) within a geographical feature 152 and/or movement of the user device 151 relative to the geographical feature 152. (Movement, direction and speed can be determined 1) by the server 101 based on changes in location indicated by the updated location data transmitted by the user devices, or 2) by the user devices and transmitted to the server 101.)

In some embodiments, the geographical feature 152 is a travel route on which the user device 151 and various other user devices 153-170 are moving in the directions indicated by various arrows attached to some of the user devices 151 and 153-170. In the particular illustrated example of FIG. 4, the (travel route) geographical feature 152 is shown as a divided highway with the user devices 151 and 153-170 moving in lanes 171 and 172 (with a median 173 in between) in the directions indicated by the various arrows. (The user devices 153-170 without arrows are also moving in the lanes 171 and 172.) Each of the user devices 151 and 153-170 is thus assumed to be in a vehicle with a user. Features and functions described with respect to this embodiment, however, are equally applicable to embodiments in which the travel route is a footpath or a trail with users who are hiking, running, or biking, or a waterway with users who are swimming, kayaking, or sailing, or a railway with users who are riding a train. Other movement or travel-related example embodiments are also covered by this embodiment.

In some embodiments, the server 101 determines the groups to which the user devices 151 and 153-170 belong based on the direction of movement of the user devices 151 and 153-170 in addition to, or instead of, the distances between the user devices 151 and 153-170. In some embodiments, for example, the server 101 groups the user device 151 together with only those other user devices (e.g., 153-158) that are all moving or travelling on the same route or in approximately the same direction as the user device 151 (i.e., west, or predominantly west, as shown in this example). On the other hand, those other user devices (e.g., 165-170) that are all moving in approximately the opposite direction of the user device 151 can be excluded from the group for the user device 151, even if the other user devices (e.g., 167-169) are within the regular geographical region 150 of the user device 151. In this manner, the user of the user device 151 communicates exclusively or primarily with other users who are travelling in generally the same direction, as if in a convoy, and can avoid talking to other users who clearly have a completely different destination.

In some variations of this embodiment, the server 101 can also base the group for the user device 151 on how far ahead or behind the other user devices 153-158 are from the user device 151. In some variations, the determination of the group for the user device 151 is made without regard to the limits of the regular geographic region 150. E.g., the server 101 can extend the geographic region 150 some distance in front of and/or some distance behind the user device 151. In this manner, the user of the user device 151 communicates exclusively or primarily with other users who are not only traveling in the same general direction, but also who are relatively close to the user device 151, and can avoid talking to those other users who will be nearby for only a very short time (traveling in the opposite direction).

In additional variations of this embodiment, the server 101 can also base the group for the user device 151 on how close the speed of the other user devices 153-158 match the speed of the user device 151. In this manner, the user of the user device 151 communicates exclusively or primarily with other users who would potentially stay within a relatively close distance of the user device 151 for a significant time period. Additionally, if the user device 151 is walking, running, bicycling or riding in a motorized vehicle, then a heuristic based on speed would generally exclude other user devices for users who are not traveling by the same means.

If the group for the user device 151 were based (at least partially) on whether the other user devices 153-170 are moving in approximately the same direction as the user device 151, then the user device 163 would potentially be within the group for the user device 151, since the absolute direction of the user device 163 is fairly similar to that of the user device 151, due to a relatively sharp curve in the (highway) geographical feature 152, even though the user device 163 is traveling in the opposite direction relative to the (highway) geographical feature 152 as the user device 151. In contrast, the user device 160 would not be within the group for the user device 151, since the absolute direction of the user device 160 is almost opposite to that of the user device 151, due to the relatively sharp curve in the (highway) geographical feature 152, even though the user device 160 is traveling in the same direction relative to the (highway) geographical feature 152 as the user device 151. In some embodiments, therefore, the server 101 bases the group for the user device 151 on the movement of the other devices 153-170 relative to the geographical feature 152 in addition to, or instead of, the movement of the user device 151. In this case, since the user device 160 is traveling in the same direction relative to the (highway) geographical feature 152 as the user device 151, the server 101 includes the user device 160 in the group for the user device 151 and excludes the user device 163. In some embodiments, a "route direction" is provided in which the route is considered to be a straight line, regardless of its actual physical geometry, in order to designate a direction for the route or for different lanes of the route. For example, user devices 151 and 153-170 travelling on a route that is oriented predominantly north/south (but which actually meanders in many different directions) are given a direction designation of either "north" or "south," so that they can be grouped accordingly. Alternatively, user devices 151 and 153-170 travelling on a route that winds back to itself (e.g., a loop or circular route) are given a "clockwise" or "counterclockwise" direction designation.

In some embodiments, the server 101 includes within the group for the user device 151 any other user devices (e.g., 154-160) that are within a geographical region 174. The geographical region 174 is based on the location and movement of the user device 151 and the shape of the geographical feature 152. In the illustrated embodiment, the geographical region 174 extends a certain distance in front of and a certain distance behind the user device 151 along the curve of the geographical feature 152 and, in this example, around the same lanes 171 that the user device 151 is in. The geographical region 174, therefore, is dynamically moving and shape-shifting as the user device 151 moves along inside the geographical feature 152. The other user devices 153 and 161 are not included in the group for the user device 151, because they are outside the geographical region 174, even though they are moving in the same direction relative to the (highway) geographical feature 152 as the user device 151. Additionally, in some embodiments, the geographical region 174 extends slightly to the sides of the lanes 171 to take in any user devices that are in vehicles stopped on the shoulder of the lanes 171.

In some embodiments, the server 101 determines which of the other user devices 153-170 to include in the group of the user device 151 based on the direction of movement of the other user devices 153-170 relative to the direction of movement of the user device 151 and/or relative to the geographical feature 152, but in a generally opposite manner as described previously. In some embodiments, for example, the server 101 groups the user device 151 together with only those other user devices (e.g., 162-170) that are all moving in approximately the opposite direction as the user device 151, either in terms of absolute movement or relative to the geographical feature 152. On the other hand, the other user devices (e.g., 153-161) that are all moving in approximately the same direction as the user device 151 can be excluded from the group for the user device 151, even if the other user devices (e.g., 155 and 156) are within the regular geographical region 150 of the user device 151. In this manner, the user of the user device 151 communicates exclusively or primarily with other users who are traveling in generally the opposite direction. This situation can occur, for example, if the user of the user device 151 is interested in talking only with other users who have already been where the user is going and can potentially inform the user of road hazards, traffic slowdowns, law enforcement patrols, and/or roadside attractions that are ahead of the user, even quite far ahead.

In some embodiments, therefore, the server 101 includes within the group for the user device 151 any other user devices (e.g., 163-169) that are within a geographical region 175. Similar to the geographical region 174, the geographical region 175 is based on the location and movement of the user device 151 and the shape of the geographical feature 152, but is for the opposite-direction lanes 172 on the opposite side of the (highway) geographical feature 152. In the illustrated embodiment, the geographical region 175 extends a certain distance in front of and a certain distance behind the user device 151 along the curve of the geographical feature 152 and, in this example, around the lanes 172. The geographical region 175, therefore, is dynamically moving and shape-shifting as the user device 151 moves along inside the geographical feature 152. The other user devices 162 and 170 are not included in the group for the user device 151, because they are outside the geographical region 175, even though they are in the same lanes 172 as the other user devices 163-169. Additionally, in some embodiments, the geographical region 175 extends slightly to the sides of the lanes 172 to take in any user devices that are in vehicles stopped on the shoulder of the lanes 172.

In some embodiments, the user of the user device 151 may not be concerned with communicating with any other users who are behind the user. Instead, for example, the user may want to be informed only of what is ahead. In this case, the server 101 terminates the geographical region 150, 174 and/or 175 at the user device 151, e.g., as indicated by a dashed line 176. Similarly, in some embodiments, if the user of the user device 151 is only concerned with communicating with other users who are in front of the user, then the server 101 can restrict the group for the user device 151 to those other user devices (e.g., 156, 157, 166, and 167) that are within a geographical region 177 that simply extends out in front and to the left and right sides of the user device 151, based on the direction of movement of the user device 151. (Although the geographical region 177 is shown as having a bell shape, any appropriate shape for the geographical region 177 can be used.) Alternatively, in some embodiments, in order for the user to communicate only with other users who have already been where the user is going, the server 101 can restrict the group for the user device 151 to those other user devices (e.g., 166-170) that enter the geographical region 150 or 177 only from in front, or through a forward or leading edge of the geographical region 150 or 177.

In some embodiments, the server 101 combines the regular geographical region 150 with any of the other geographical regions 174, 175 or 177, e.g., in a manner similar to that for the "added" embodiment for the artificial boundary 142, described above. In this case, the user device 151 can communicate with other user devices (e.g., 155, 156, and 167-169) that are nearby and also have access to any of the additional features and advantages for any of the embodiments described herein for FIG. 4. In some embodiments, a stationary user device or a user device not within the geographical feature 152 (e.g., a user device 178), but within the regular geographical region 150 for a limited time, can also be included in the group for the user device 151.

The embodiments for dynamically altering the geographical region or group based on movement of user devices or a geographical feature described with reference to FIG. 4 are additional variations on the two-way radio simulation concept made possible by computer technology and which enhance the enjoyment of the users of the user devices. In some embodiments, the look and feel of the operation of the user devices remains similar to that of a two-way radio. Additionally, these embodiments are distinguished from other two-way radio simulation applications, wherein it may be possible to create a channel or chat room for users who are within a particular highway, route, area, or other geographical feature, and then all of the users simply have to trust that everyone who enters that channel is actually within that geographical feature.

In some embodiments, the area of a geographical region for a user device can change or geographical regions for different user devices can be different sizes, as shown by FIG. 5. In the illustrated example, user devices 201-203 are either different user devices or the same user device at different times or locations. The server 101 has determined geographical regions 204-206 for the user devices 201-203, respectively. The geographical region 204 for the user device 201 is considered to have an initial or default size, area or radius. The geographical region 205 for the user device 202 is considered to have been decreased from the initial or default size, area or radius, as indicated by dashed region 207. The geographical region 206 for the user device 203 is considered to have been increased from the initial or default size, area or radius, as indicated by dashed region 208.

In some embodiments, the server 101 will change the size of the geographical regions 204-206 depending on the level of audio stream traffic/congestion for, or number of other user devices within range of, the user devices 201-203. For example, if a user device (e.g., 203) is experiencing a relatively low level of audio stream traffic, e.g., due to not having very many other users to talk to or a number of other user devices below a minimum threshold (e.g., represented by one other user device 209 within the dashed region 208), when the geographic region 206 is at one size (e.g., as represented by the dashed region 208), then the server 101 will increase the size of the geographic region 206 to encompass more other user devices (e.g., 201, 209 and 210). In this manner, the audio stream traffic will likely be increased to a more acceptable or interesting level, due to the increased number of other user devices within the geographical region 206. (The user devices 201 and 203 are able to communicate with each other, because the user device 201 is within the geographical region 206 of the user device 203, even though the user device 203 is not within the geographical region 204 of the user device 201. In other words, in some embodiments, as long as one of the two user devices is within the geographical region of the other, then the server 101 will allow the two user devices to communicate.) On the other hand, if a user device (e.g., 202) is experiencing a relatively high level of audio stream traffic, e.g., due to having too large of a number of other users to talk to or a number of other user devices above a maximum threshold (e.g., represented by nine other user devices 211-213 within the dashed region 207), when the geographic region 205 is at one size (e.g., as represented by the dashed region 207), then the server 101 will decrease the size of the geographic region 205 to encompass fewer other user devices (e.g., 213). In this manner, the audio stream traffic will likely be decreased to a more acceptable level, due to the decreased number of other user devices within the geographical region 205. In this example, the number of other user devices (e.g., 202 and 210-212) within the geographical region 204 for the user device 201 is considered to already be at an acceptable level, so the size, area or radius of the geographical region 204 is not changed.

As a result, each user devices 201-203 may have a different dynamically adjustable size, area or radius for its geographical region 204-206, depending on the level of audio stream traffic/congestion or number of other user devices within range. Additionally, in some embodiments, the user may set a value for a desired level of audio stream traffic/congestion or acceptable number of other user devices within range, and the value is transmitted from the user device to the server 101 for determining when and how much to change the size, area or radius of the geographical region.

Thus, the apparent range of the user devices 201-203 can expand and contract due to congestion, such that in a more crowded environment as more users enter the area, to simulate the decreased signal-to-noise ratio an actual two-way radio system would have, the communication range is reduced. Additionally, in some embodiments, some user devices have increased ranges provisioned for them (e.g., when the user pays for, or qualifies for, a premium experience), thereby simulating having a better or higher antenna, more power, or a better receiver. The change in the size, area or radius of the geographical region also simulates the function of a squelch knob available on some conventional two-way radios. In this manner, these embodiments are additional variations on the two-way radio simulation concept made possible by computer technology and which enhance the enjoyment of the users of the user devices. In some embodiments, the look and feel of the operation of the user devices remains similar to that of a two-way radio.

Figure 6:
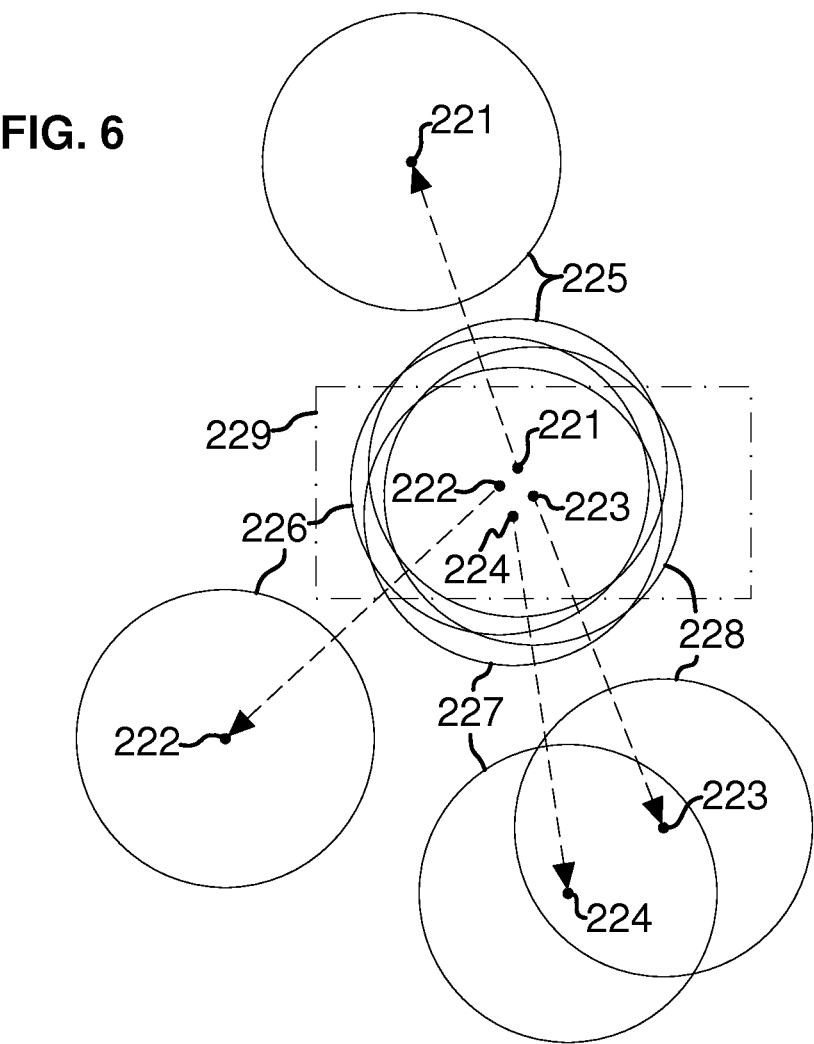

In some embodiments, as illustrated by FIG. 6, the server 101 determines the groups for the user devices (e.g., 221-224) at a given time, and then the server 101 allows the groups to persist afterwards, regardless of the subsequent locations of the user devices 221-224. For example, when the user devices 221-224 are near each other with all their geographical regions 225-228 overlapping, so that the server 101 groups them together, as described above, then the users select an option in the two-way radio simulation applications on their user devices 221-224 to persist as a group, which can be implemented as a special, private or premium channel. Thus, the users cause or enable their user devices 221-224 to transmit a data packet(s) to the server 101 with instructions to maintain or freeze their group for a period of time, indefinitely, or until an event occurs. As a result, the user devices 221-224 can disperse, as shown, so that they are no longer within each other's geographical regions 225-228, but the server 101 will maintain them grouped together as if they were still within range of each other, i.e., without regard to whether the user devices 221-224 included in the group remain within the geographical regions 225-228 for each other. In other words, the time for creating the groups by the server 101 can be different from the times at which the audio streams are retransmitted to the user devices 221-224. In this manner, a number of users (e.g., friends, family, coworkers, etc.) can come together at a meeting place (e.g., the entrance of a large amusement park, the beginning of a long hike/bike trail, etc.) at the same time, form a group or private channel together, and then split up to pursue their own interests or proceed at their own pace, and still be assured that they can communicate with each other no matter how far apart they happen to become.

In some embodiments, the server 101 forms the groups for the user devices 221-224 that enter or pass through or next to a particular area or geographical feature 229, regardless of whether they are together at the same time. For example, a number of users can agree to form a group at the beginning of a long trail, and a user who arrives late (e.g., after the others have gone out of range) can still join the group by entering the geographical feature 229. Alternatively, the geographical feature 229 can represent a particular place (e.g., a sports stadium, important monument, landmark, etc.), and the server 101 can allow the user devices 221-224 that enter or pass by the geographical feature 229 to join a special group or channel set up through the server 101 for anyone who wants to discuss it (e.g., the sporting event, monument, landmark, etc.) after having watched or visited it. In some embodiments, the server 101 allows each user device 221-224 to remain in the group for a given period of time (or until the users select to drop out by causing their user device 221-224 to transmit a data packet(s) to the server 101 with instructions to leave the group), so that the users can be assured that they will discuss the sporting event, monument, landmark, etc. only with other users who have seen or visited it recently.

These embodiments for persistent or continuing groups do not exactly simulate the conventional operation of a two-way radio. Instead, these embodiments are additional variations on the two-way radio simulation concept made possible by computer technology and which enhance the enjoyment of the users of the user devices. In some embodiments, the look and feel of the operation of the user devices remains similar to that of a two-way radio. Additionally, these embodiments are distinguished from other two-way radio simulation applications or audio chat applications, wherein it may be possible to create a channel or chat room for users who are interested in a particular geographical feature, regardless of whether they have actually visited it.

Figure 7:
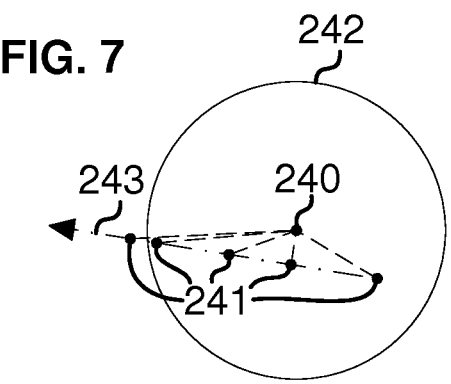

In some embodiments, as illustrated by FIG. 7, the server 101 provides the user devices (e.g., 240 and 241) with audible cues to indicate how distant they are from each other. Additionally, the audible cues change as the distance between the user devices 240 and 241 changes, e.g., as one of the user devices 241 passes through the geographical region 242 of the other user device 240 in the direction of arrow 243. For example, when the distance between the user devices 240 and 241 increases, then the server 101 calculates the distance between them and generates or creates altered audio streams using one or more techniques that cause the audio streams to sound weaker. For example, the server 101 can apply a computed transformation to the audio stream (e.g., lowering the apparent sound volume, limiting the bandwidth of the audio stream, adding an echo to the audio stream, and/or lowering the bit/sample rate), and/or the server 101 can mix the audio stream with some other sound (such as a noise, a hiss, and/or static). (Creating the altered audio stream by changing a signal-to-noise ratio of the audio stream based on the distance between the user devices 240 and 241, for example, is particularly suited to simulating a noisy radio channel that has several other user devices producing interfering audio streams. When there are two audio streams merged together, for example, and one audio stream stops, the server 101 will cause the other audio stream to sound stronger, louder or better.) On the other hand, when the user devises 240 and 241 are closer together, then the server 101 calculates the distance between them and generates the audio streams to sound stronger, louder or clearer. In this manner, the fact that the user device 241 approaches and then recedes from the user device 240 can be apparent to the users by a gradual change in these audible cues, whereby the audio streams become stronger, louder or clearer and then progressively fade away (i.e., weaker, quieter, more noisy) to the point that the user devices 240 and 241 no longer receive the audio streams from each other once the user device 241 passes outside the geographical region 242 of the user device 240. Alternatively, in some embodiments, the server 101 transmits the audio stream to the user device 240 or 241 without alteration, but with additional meta data that indicates how the audio stream is to be altered according to any of the techniques described herein. In this case, the user device 240 or 241 then performs the alterations to generate the altered audio stream in accordance with the meta data instructions before presenting the audio stream to the user. In some embodiments, both the server 101 and the user device 240 or 241 perform various parts of the alterations.

Additionally, the user of the user device 240 can potentially distinguish the relative difference in distances to multiple other user devices by the difference in sound volume, quality or noise in the multiple audio streams that the server 101 has altered, merged and retransmitted to the user device 240. The server 101 calculates the distance between the user device 240 and each of the other user devices that are transmitting audio streams and alters the audio streams according to the calculated distances. In this manner, some of the confusion that may be caused by overlapping audio streams that have been merged into the unified audio stream for the user device 240 is alleviated by the fact that one of the audio streams sounds stronger or clearer than the others, since more distant user devices contribute less to the overall mix, i.e., nearer user devices seem to talk over further user devices. This feature, therefore, can reduce some of the need to change the size, area or radius of the geographical areas due to audio stream traffic/congestion, as described above.

In some embodiments, the server 101 alters the audio stream in accordance with the inverse square of the distance between the user devices 240 and 241, thereby simulating the fading that occurs with distance between actual two-way radios. In other embodiments, the server 101 uses other functions (e.g., linear, logarithmic, stepwise, etc.) to express or simulate diminishing signals over distance, even if the functions do not reflect the real world. These embodiments for altering the audio streams, therefore, simulate the conventional fading of a two-way radio, with additional variations on the two-way radio simulation concept made possible by computer technology and which enhance the enjoyment of the users of the user devices. In some embodiments, the look and feel of the operation of the user devices remains similar to that of a two-way radio. Additionally, these embodiments are distinguished from other two-way radio simulation applications or audio chat applications, wherein the sound volume and/or quality of the audio streams remain constant, or the audio streams are altered without regard to distance between user devices.

Figure 8:
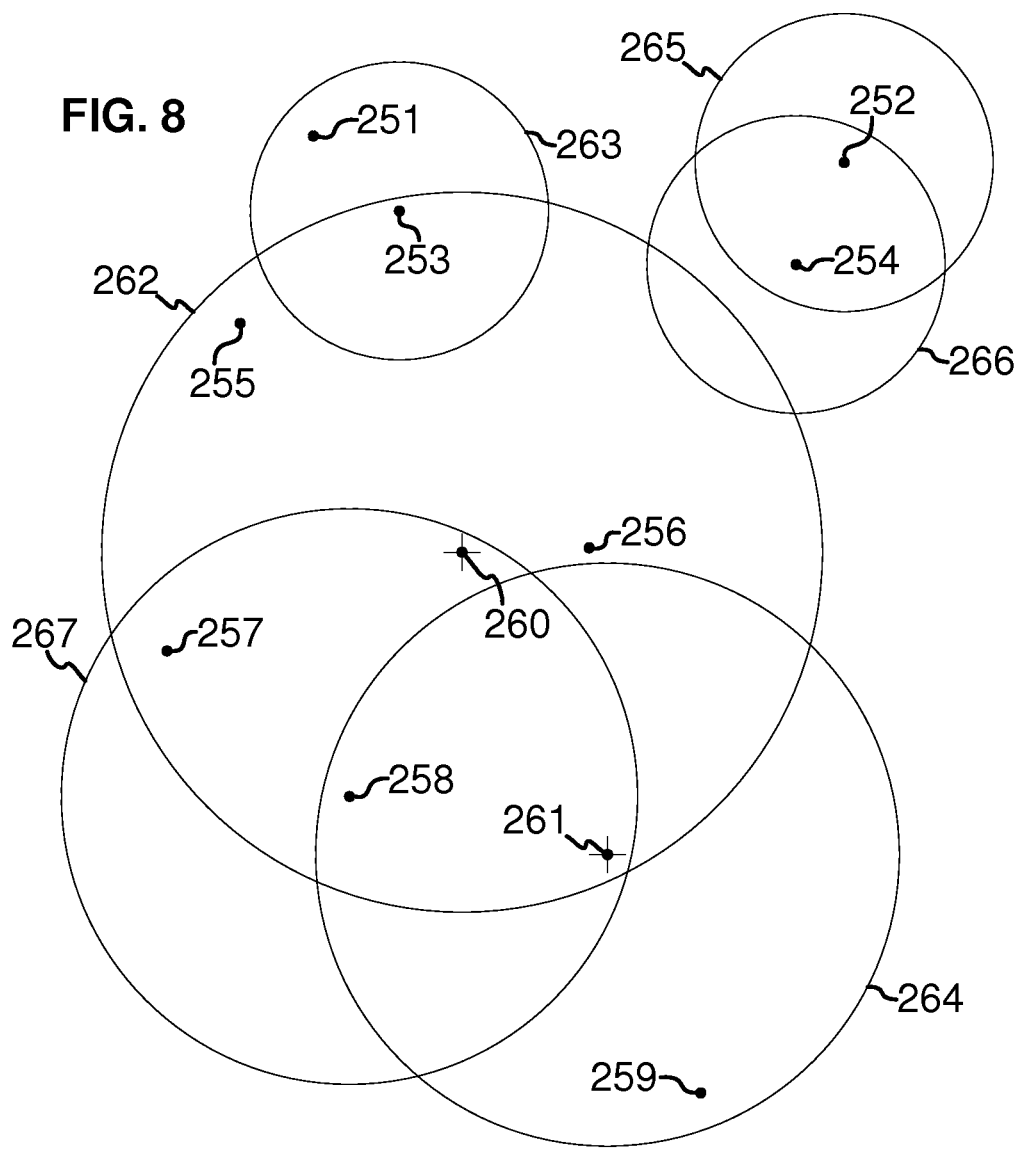

In some embodiments, as illustrated by FIG. 8, the server 101 determines which user devices (e.g., 251-259) can communicate with each other based not only on their locations relative to each other, as described above, but also relative to a shared stationary or mobile intermediate location, e.g., one or more simulated stationary or mobile radio transmission repeater towers 260 and 261. The repeater towers 260 and 261 are virtual objects created by the server 101 for the purpose of enabling some of the user devices 251-259 to communicate with each other that might not otherwise be able to. In other words, even though they may not be within each other's geographical regions, as long as the user devices 253 and 255-258 are within the geographical region 262 of the repeater tower 260, they can communicate with each other as if their audio streams were being transmitted first to the repeater tower 260 and from there to the other user devices 253 and 255-258. In reality though, the server 101 calculates which user devices 253-258 are within the geographical region 262 and groups them together for audio stream retransmissions, along with any other user devices within the regular geographical regions of the user devices 253 and 255-258.

For example, the user device 251 is within the geographical region 263 of the user device 253, so the server 101 allows the user device 253 to communicate with the user device 251 in addition to the user devices 255-258 in this example. However, the user device 251 is not within the geographical region 262 of the repeater tower 260, so the server 101 allows it to communicate only with the user device 253 in this example. The user device 259 is also not within the geographical region 262 of the repeater tower 260, nor is it within the geographical regions of any of the other user devices 251-258, but it is within the geographical region 264 of the other repeater tower 261 (along with the user device 258), so the server 101 allows it to communicate only with the other user device 258 in this example. On the other hand, in some embodiments, the server 101 will concatenate the repeater towers 260 and 261 together, since the repeater tower 261 is within the geographical region 262 of the repeater tower 260, so that the server 101 will also group the user device 259 with the user devices 253, 255 and 256, as if they are communicating through both repeater towers 260 and 261. Additionally, the user devices 252 and 254 are also not within the geographical region 262 of the repeater tower 260, so they can communicate only with each other in this example, since they are within only each other's geographical regions 265 and 266, respectively. In some embodiments, however, if the geographical region (e.g., 266) of a user device (e.g., 254) overlaps the geographical region 262 of the repeater tower 260, then the server 101 groups the user device (254) with the other user devices 253 and 255-258 that are within the geographical region 262 of the repeater tower 260.

In some embodiments, the repeater tower technique can be used to implement some of the artificial boundary embodiments described above with reference to FIG. 3 and/or some of the embodiments for dynamically altering the geographical region or group based on movement of user devices or a geographical feature described above with reference to FIG. 4. For example, the server 101 can establish one or more repeater towers with virtual locations such that their geographical regions combine to approximate the artificial boundary 142 of FIG. 3, the geographical feature 152 (or portions thereof) of FIG. 4, or any geofence.

In some embodiments, the server 101 also applies the fading simulation techniques, described above, with the repeater tower technique. In this case, the server 101 calculates the distance (for determining how much to change the sound volume, quality or noise level in any given audio stream) between any two user devices 251-259 by adding the distances 1) from the first one of the user devices 251-259 to the repeater tower 260 and 261, 2) from one repeater tower 261 to the next repeater tower 260 (if used, plus any additional repeater towers), and 3) from the repeater tower 260 and 261 to the second one of the user devices 251-259. Additionally, in some embodiments, the server 101 treats the repeater towers 260 and 261 as if they enhance or increase the power level of transmission signals when determining how much to change the sound volume, quality or noise level in any given audio stream between the user devices 251-259.

In some embodiments, for purposes of the fading simulation, when the server 101 determines the groups for the user devices 251-259, the server 101 calculates or selects a virtual transmission path with the shortest distance, fewest links, or least fade through the repeater towers 260 and 261. For example, for the user devices 257 and 258, the user device 257 is within the geographical region 267 of the user device 258, both user devices 257 and 258 are within the geographical region 262 of the repeater tower 260, and the user device 258 is within the geographical region 264 of the other repeater tower 261. Therefore, the server 101 calculates the distance of the direct path between them, the distance of the path through the repeater tower 260, and the distance of the path through both repeater towers 260 and 261. The server 101 then selects whichever path results in the shortest distance or fewest links. Alternatively, the server 101 also calculates which path would result in the highest quality audio and selects that one.

In some embodiments, the server 101 accepts requests from user devices to establish the location and/or the simulated transmission strength for the repeater towers. For example, users can purchase or earn (e.g., due to level of usage) the right to make such requests in order to set up their own artificial boundary or geofence or to extend their communication range in some place.

These repeater tower embodiments simulate the conventional usage of radio repeater equipment available for some types or brands of two-way radios, with additional variations on the two-way radio simulation concept made possible by computer technology and which enhance the enjoyment of the users of the user devices. In some embodiments, the look and feel of the operation of the user devices remains similar to that of a two-way radio. Additionally, these embodiments are distinguished from other two-way radio simulation applications or audio chat applications, wherein groups are created without regard to distance between user devices.

Figure 9:
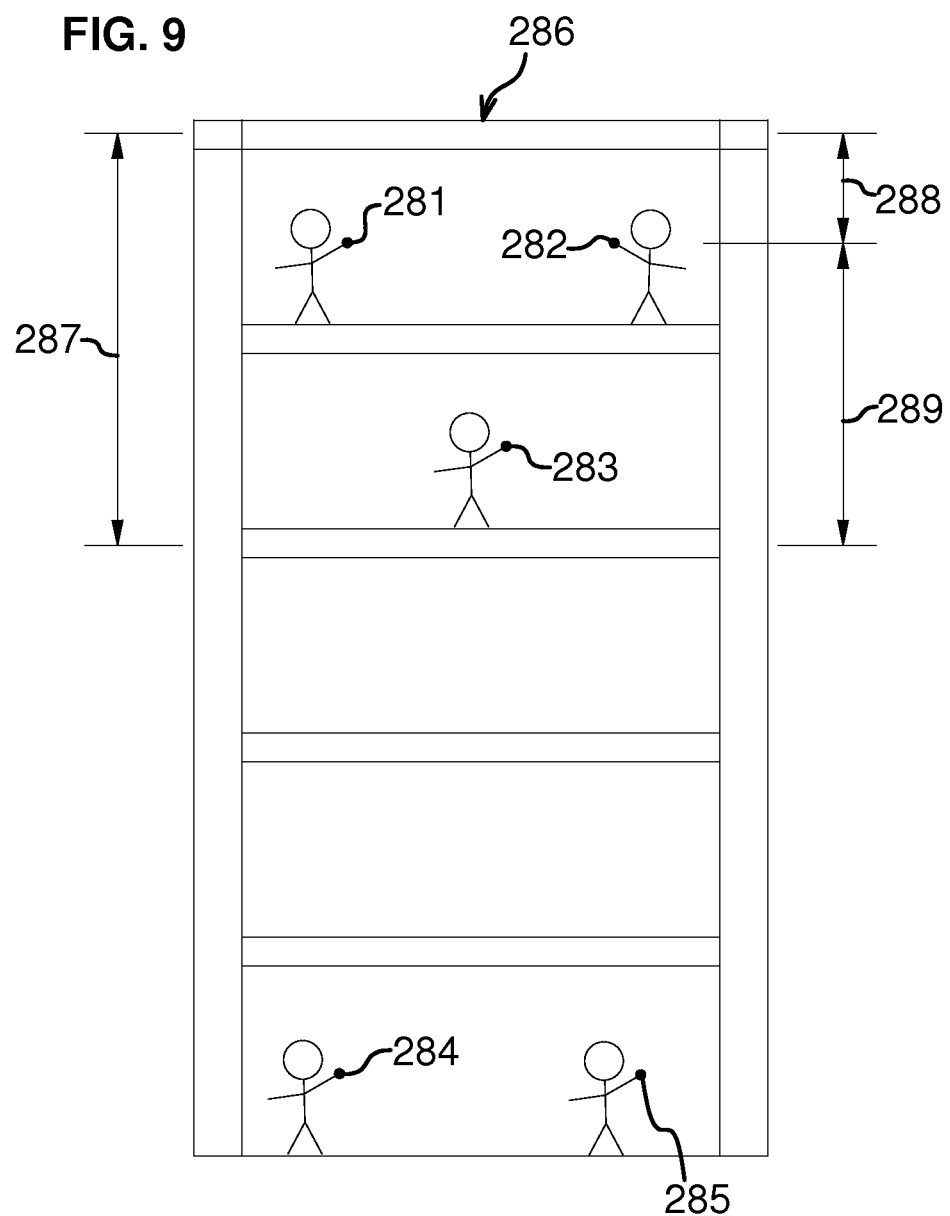

In some embodiments, as illustrated in FIG. 9, the server 101 also establishes groups based on altitude or elevation of the user devices 281-285 in addition to their geographical regions, described above. In some embodiments, the user devices 281-285 generate and transmit (vertical) altitude data, in addition to the (horizontal) location data, to the server 101. For example, the user devices 281-285 may be inside a building 286 on different floor levels, and some of the users 281-283 may want to communicate only with other users 281-283 on the same floor level or a range of floor levels, but not with other users on other floor levels 284 and 285. In some embodiments, the server 101 determines an elevation range 287 for a known range of floor levels. When the user devices 281-283 are determined to be within the elevation range 287, based on the received altitude data, the server 101 establishes groups for these user devices 281-283, so that they can communicate together. In some embodiments, the server 101 establishes a certain distance 288 above and/or a certain distance 289 below the user device 282. The server 101 then determines which other user devices 281 and/or 283 are within this elevation range above and/or below the user device 282 and creates a group for the user device 282 with these other user devices 281 and/or 283. Alternatively, in some embodiments, the server 101 determines the geographical regions based on a wireless access point through which the user devices access the radio simulation system 100. In this case, the range of the geographical regions for each user device is limited both horizontally and vertically by the three-dimensional range of the wireless access point. In some embodiments, the user devices access the radio simulation system 100 through different wireless access points, but if two or more of the wireless access points have ranges that overlap or are adjacent or near to each other, then the server 101 groups the user devices (that are connected through these geographically related wireless access points) together. In some embodiments, if multiple wireless access points are considered to be part of a particular geographical feature (e.g., a sports stadium, a nature preserve, a travel route, etc.), then the server 101 groups the user devices (that are connected through these geographically related wireless access points) together.

These embodiments for altitude-dependent, or vertical, groups do not exactly simulate the conventional operation of a two-way radio. Instead, these embodiments are additional variations on the two-way radio simulation concept made possible by computer technology and which enhance the enjoyment of the users of the user devices. In some embodiments, the look and feel of the operation of the user devices remains similar to that of a two-way radio.

Figure 10:
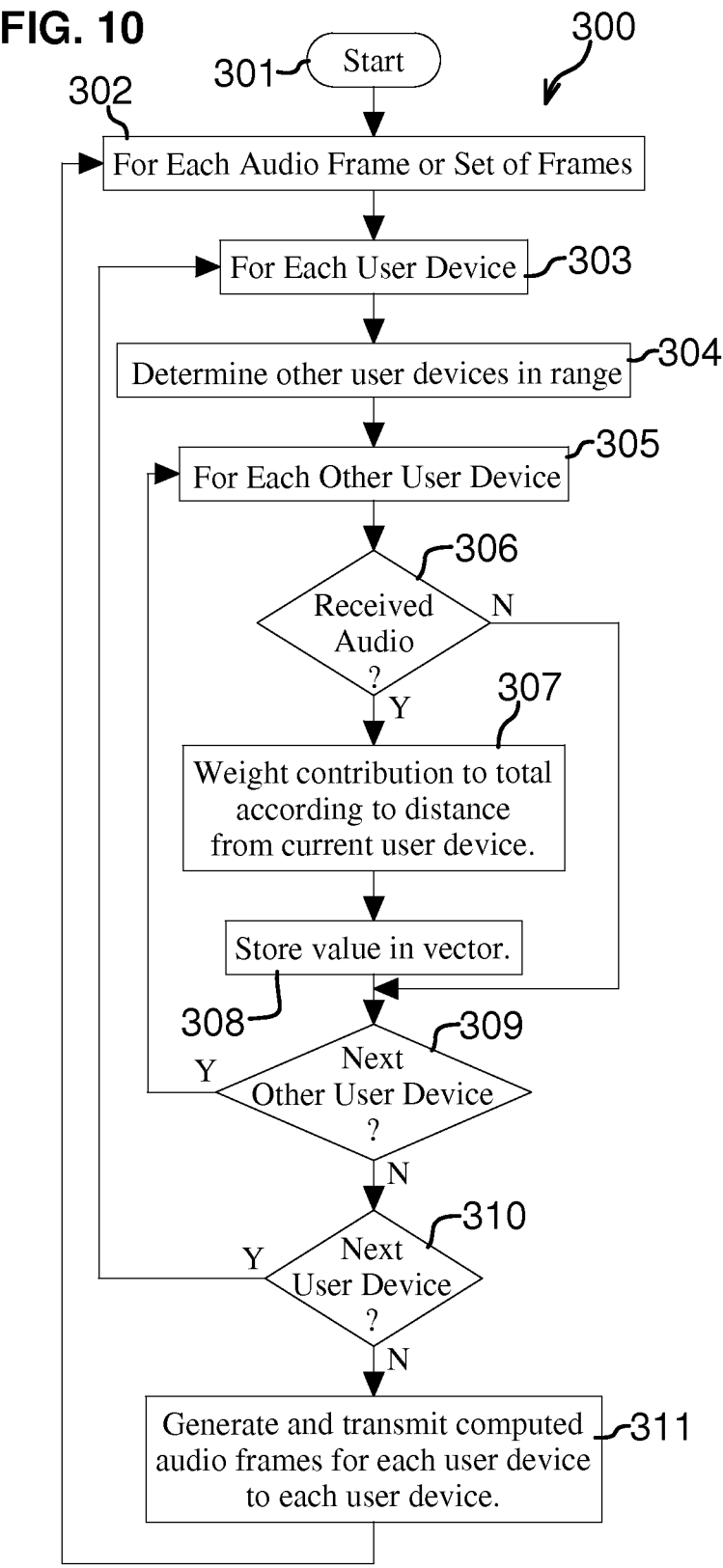
FIG. 10 is a simplified flowchart of a process performed by a server for use in the radio simulation system shown in FIG. 1 in accordance with an embodiment of the present invention.

FIG. 10 shows a simplified flowchart of acts and functions for a process 300 performed by the server 101, in accordance with some embodiments of the present invention. The process 300 represents one or more programs, applications or routines for performing the functions described. The process 300 is shown for illustrative and explanatory purposes only. Other processes having different specific steps, combinations of steps, or order of steps are also within the scope of the subject matter herein. Additionally, in some embodiments, the process 300 represents computer readable instructions stored in a non-transient computer readable medium for controlling the function of a computer.

Upon starting (at 301), for each audio frame (or set of frames) (at 302), the server 101 loops through steps 303-311 to generate the unified audio streams with the individual audio streams for that audio frame that are to be retransmitted to the user devices Dev1-DevN. Additionally, for each user device Dev1-DevN (at 303), the server 101 loops through steps 304-309 to generate the unified audio frame with the individual audio frames for that user device Dev1-DevN. In some embodiments, the server 101 performs the steps for each audio frame and/or for each user device Dev1-DevN in parallel.

The server 101 then determines (at 304) which other user devices Dev1-DevN are within range, i.e., within the geographical region 103-108, for the current user device Dev1-DevN. The server 101, thus, acquires the most recent location data received from each of the user devices Dev1-DevN, calculates the geographical region 103-108 from the location data (with any of the various options described above for modifying the geographical region 103-108) for the current user device Dev1-DevN, and computes which of the other user devices Dev1-DevN are within that geographical region 103-108.

For each of the other user devices Dev1-DevN (at 305) determined to be within the geographical region 103-108 of the current user device Dev1-DevN, the server 101 loops through steps 306-308 to generate and alter (if needed) the current audio frame for the individual audio stream for that other user device Dev1-DevN. In some embodiments, the server 101 performs the steps for each of the other user devices Dev1-DevN in parallel. If the server 101 has not received, or does not have, a current audio frame for the current other user device Dev1-DevN, as determined at 306, then the server 101 branches down to 309 to determine and select the next other user device Dev1-DevN and then return to 305 (if there is a next other user device Dev1-DevN). If the server 101 has a current audio frame for the current other user device Dev1-DevN, as determined at 306, then the server 101 determines (at 307) the relative weight contribution of that audio frame to the total unified audio frame currently being formed, based on the distance from the current user device Dev1-DevN to the current other user device Dev1-DevN (including passing through any virtual repeater towers 260 and 261), in accordance with the fading simulation techniques, described above. A value for the weight contribution is stored (at 308) in a vector indicative of the current audio frame, the current user device Dev1-DevN, and the current other user device Dev1-DevN. The server 101 then determines (at 309) whether there is a next other user device Dev1-DevN. If so, then the server 101 selects the next other user device Dev1-DevN as the new current other user device Dev1-DevN and returns to 305.

If the server 101 has processed each of the other user devices Dev1-DevN (from 305 to 309) for the current user device Dev1-DevN, so that there is not a next other user device Dev1-DevN, as determined at 309, then the server 101 proceeds to 310 to determine whether there is a next user device Dev1-DevN. If so, then the server 101 selects the next user device Dev1-DevN as the new current user device Dev1-DevN and returns to 303 above.

If the server 101 has processed each of the user devices Dev1-DevN (from 303 to 310) for the current audio frame, so that there is not a next user device Dev1-DevN, as determined at 310, then the server 101 proceeds to 311 to generate computed unified audio frames for each user device Dev1-DevN. The server 101 applies the stored weight contribution value to each individual audio frame that forms the unified audio frames for each user device Dev1-DevN. If there is more than one individual audio frame for any of the unified audio frames, then the server 101 also adds appropriate noise to the individual audio frames for simulating a noisy radio channel. The server 101 then transmits the computed unified audio frames to each user device Dev1-DevN and then returns to 302 to process, or wait for, the next audio frame and repeat the process 300 from 302.

Figure 11:
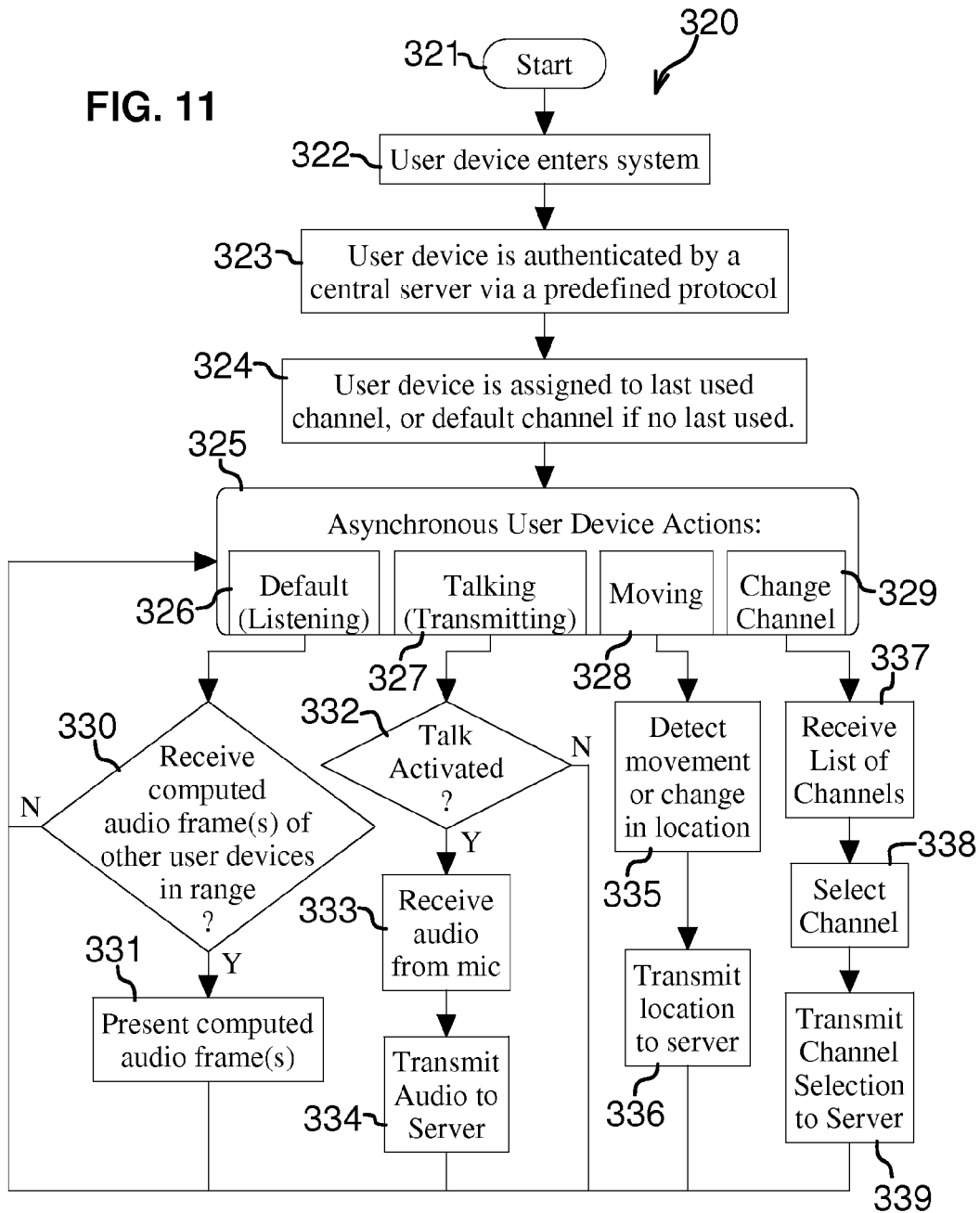
FIG. 11 is a simplified flowchart of a process performed by a user device in the radio simulation system shown in FIG. 1 in accordance with an embodiment of the present invention.

FIG. 11 shows a simplified flowchart of acts and functions for a process 320 (e.g., for a two-way radio simulation application) performed by the user devices Dev1-DevN, in accordance with an embodiment of the present invention. The process 320 represents one or more programs, applications or routines for performing the functions described. In some embodiments, the process 320 is implemented in a user device Dev1-DevN that can communicate audio data packets and control data via an application-layer protocol on a switched packet network, e.g., the communication system 102. The process 320 is shown for illustrative and explanatory purposes only. Other processes having different specific steps, combinations of steps, or order of steps are also within the scope of the subject matter herein. Additionally, in some embodiments, the process 320 represents computer readable instructions stored in a non-transient computer readable medium for controlling the function of a computer.

Upon starting (at 321), the user device Dev1-DevN enters (at 322) the radio simulation system 100 by transmitting a data packet to the server 101 with a request to join, login, etc. The user device Dev1-DevN is authenticated (at 323) by a central server (e.g., 101) via a predefined protocol, wherein data packets are transmitted to and received from the server 101 to login or to initially register with the server 101, e.g., with a username and password combination, as mentioned above. The user device Dev1-DevN receives (at 324) an assignment from the server 101 to the last channel used (if channels are available) or to a default channel if there was no last channel used. To receive this assignment, the user device Dev1-DevN generates and transmits its location data, as described above, in a data packet(s) to the server 101, which uses the location data to determine the channels that are available to the user device Dev1-DevN and transmits a data packet(s) back to the user device Dev1-DevN with the channel data, including initial channel assignment data. During about this time, the server 101 also uses the location data to determine the geographical region 103-108 for the user device Dev1-DevN and then determines the other user devices Dev1-DevN that are within that geographical region 103-108 (with any of the variations described above), so that the server 101 can begin generating and transmitting the appropriate computed audio frames for the user device Dev1-DevN.

The user device Dev1-DevN then selects (at 325) asynchronous user device actions 326-329, e.g., to be performed as separate routines in parallel or as multi-tasks. The user device Dev1-DevN also begins receiving the computed audio frames from the server 101, if the server 101 has received any individual audio frames for retransmittal. Therefore, the default action or routine is listening 326, wherein if the user device Dev1-DevN has received any computed audio frames (as determined at 330) of any other user devices Dev1-DevN within range, then the user device Dev1-DevN presents (at 331) the computed audio frames through the listening device (e.g., speakers, earbuds, etc.) to the user and then repeats the listening routine 326 in a manner that presents the computed audio frames as an apparent real-time audio stream. In some embodiments, therefore, the user device Dev1-DevN almost immediately begins presenting the computed audio frames after login. On the other hand, if the user device Dev1-DevN has not received any computed audio frames, as determined at 330, then the listening routine 326 simply loops in a waiting pattern.

Another asynchronous user device action or routine is "talking" (327), which also involves transmitting data packets with audio frames to the server 101. For this routine, the user device Dev1-DevN determines (at 332) whether talk has been activated, e.g., as described above for activating the communication feature. If not, then the talking routine 327 simply loops in a waiting pattern. Once talk has been activated, as determined at 332, the user device Dev1-DevN receives (at 333) audio data from the microphone of the user device Dev1-DevN (or attached thereto) and generates audio data packets, which it transmits (at 334) to the server 101. Under control of the talking routine 327, the user device Dev1-DevN continues to loop through 333 and 334 as long as talk is activated, as determined at 332.

Another asynchronous user device action or routine is "moving" (328). For this routine, the user device Dev1-DevN loops through monitoring data from its inertial and/or location sensors and comparing updated data with previous data. When it detects (at 335) movement or a change in location (based on the data from its inertial and/or location sensors), the user device Dev1-DevN transmits (at 336) its current location data in a data packet(s) to the server 101 and then repeats the moving routine 328. In some embodiments, the user device Dev1-DevN also transmits its location data in a data packet(s) to the server 101 at periodic intervals.

Another asynchronous user device action or routine is "change channel" (329). For this routine, the user device Dev1-DevN responds to an input by the user and transmits a data packet(s) to the server 101 to request a list of channels that are available to it based on its location and permissions. When the user device Dev1-DevN receives (at 337) the list of available channels, it presents the list on a display device screen to the user for selection. When the user device Dev1-DevN receives (at 338) an input by the user selecting one of the available channels, the user device Dev1-DevN transmits (at 339) a data packet(s) to the server 101 with data indicating the channel selection. In response to the channel selection data, the server 101 switches to generating the appropriate computed audio frames for the selected channel for the user device Dev1-DevN.

Figure 12:
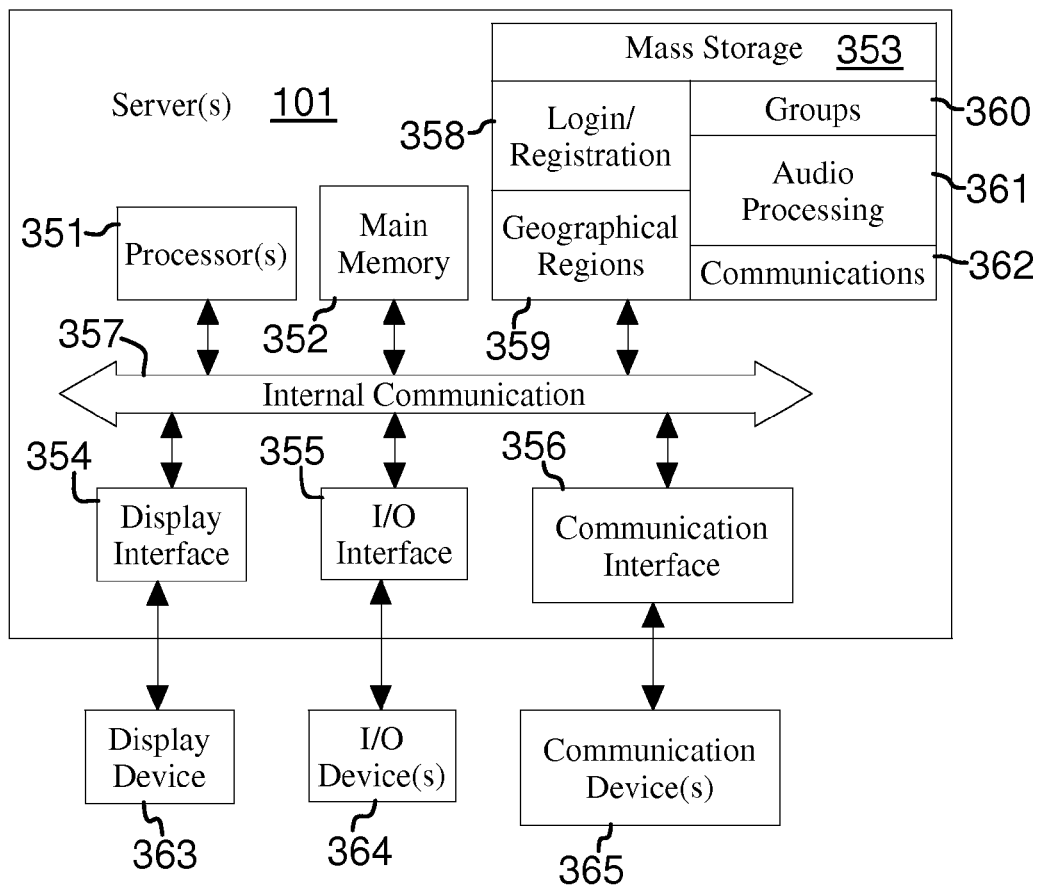
FIG. 12 is a simplified schematic drawing of a server for use in the radio simulation system shown in FIG. 1 in accordance with an embodiment of the present invention.

FIG. 12 shows a simplified schematic drawing for an example embodiment of the server 101. Other embodiments can include other components, other combinations of components, and/or other interconnections between components. For the illustrated embodiment, the server 101 generally includes one or more processors 351, one or more main memory units 352, one or more mass storage units 353, a display interface 354, one or more I/O (input/output) interfaces 355, and one or more communication interfaces 356 (among other appropriate components not shown for simplicity) interconnected by one or more internal communication subsystems 357.

The processor 351 represents one or more microprocessors, central processing units, graphic processing units, etc., within a single housing or distributed among multiple housings. The processor 351 interacts with the other components 352-357 to perform the various computing functions for carrying out the primary functions of the server 101 described herein in accordance with computer readable instructions.

The main memory unit 352 represents one or more static or dynamic memory modules, memory chips, memory cards, cache memory subsystems, etc., associated with the processor 351 as appropriate. The main memory unit 352 stores the computer readable instructions and data that the processor 351 operates with or on.

The mass storage unit 353 represents storage drives and media for one or more magnetic storage devices, optical storage devices, flash storage devices, tape storage devices, disk storage devices, etc. The mass storage unit 353 contains applications 358-362 and data for the computer readable instructions used by the processor 351 and the main memory unit 352 to perform the various functions of the server 101. For example, a login/registration application 358 includes instructions and data for the processor 351 to handle data received from the user devices Dev1-DevN for requesting access to the server 101. A geographical regions application 359 includes instructions and data for the processor 351 to receive and process the location data from the user devices Dev1-DevN and to calculate data for the geographical regions 103-108 (with any of the variations described herein) for each of the user devices Dev1-DevN. A groups application 360 includes instructions and data for the processor 351 to use the data for the geographical regions 103-108 and the location data from the user devices Dev1-DevN to calculate which other user devices Dev1-DevN are within the geographical regions 103-108 of each user device Dev1-DevN and/or to form dynamic groups (with any of the variations described herein) for each of the user devices Dev1-DevN. An audio processing application 361 includes instructions and data for the processor 351 to receive and process the audio data from the user devices Dev1-DevN, determine whether and how much to alter the audio data (e.g., for fading) as described herein, and generate the computed audio frames to be transmitted to the appropriate user devices Dev1-DevN. A communications application 362 includes instructions and data for the processor 351 to receive/transmit and parse/generate data packets from and to the user devices Dev1-DevN. Other applications, combinations of applications, and/or variations on application functions can be used in other embodiments.

The display interface 354 represents components for connecting to one or more display devices 363. The display device 363 can be internal or external to the server 101 and may be shared among multiple servers 101. Alternative embodiments can have no display devices, e.g., for a fully voice-controlled embodiment with only audible feedback to the admin or user.

The I/O interface 355 represents components for connecting to one or more I/O devices 364. The I/O devices 364 may be shared among multiple servers 101 and represent various keyboards, keypads, touch pads, pointing devices, etc. A user, such as a system administrator, uses the I/O devices 364 and the display device 363 to interface with the server 101 to configure or control its functions.

The communication interface 356 represents one or more components for connecting to the communication devices 365 for network connections, such as Ethernet, optical cables, IEEE 1394, etc. The communication devices 365 represent components for accessing the communication system 102. Network data packets to and from the user devices Dev1-DevN are transmitted and received through the communication devices 365 and the communication interface 356.

Figure 13:
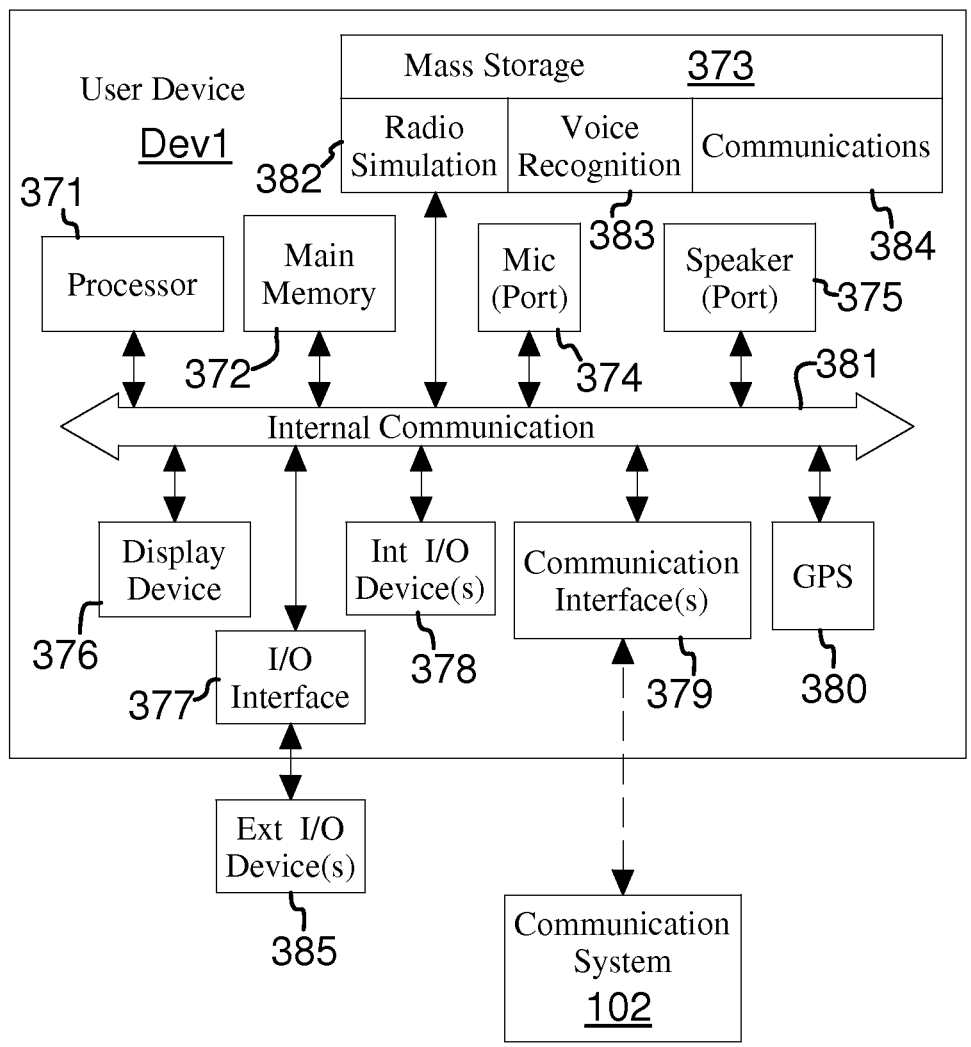
FIG. 13 is a simplified schematic drawing of a user device for use in the radio simulation system shown in FIG. 1 in accordance with an embodiment of the present invention.

FIG. 13 shows a simplified schematic drawing for an example embodiment of the user devices (e.g., Dev1). Other embodiments can include other components, other combinations of components, and/or other interconnections between components. For the illustrated embodiment, the user device Dev1 generally includes one or more processors 371, one or more main memory units 372, one or more mass storage units 373, a microphone (or a port for a microphone) 374, one or more speakers (or a port for speakers or headphones) 375, a display device (or interface for a display device) 376, one or more I/O interfaces 377, one or more internal I/O devices 378, one or more communication interfaces 379, and a GPS unit 380 (among other appropriate components not shown for simplicity) interconnected by one or more internal communication subsystems 381.

The processor 371 represents one or more microprocessors, central processing units, graphic processing units, etc. The processor 371 interacts with the other components 372-381 to perform the various computing functions for carrying out the primary functions of the user device Dev1 described herein in accordance with computer readable instructions.

The main memory unit 372 represents one or more static or dynamic memory modules, memory chips, memory cards, cache memory subsystems, etc., associated with the processor 371 as appropriate. The main memory unit 372 stores the computer readable instructions and data that the processor 371 operates with or on.

The mass storage unit 373 represents storage drives and media for one or more magnetic storage devices, optical storage devices, flash storage devices, tape storage devices, disk storage devices, etc. The mass storage unit 373 contains applications 382-384 and data for the computer readable instructions used by the processor 371 and the main memory unit 372 to perform the various functions of the user device Dev1. For example, a radio simulation application 382 includes instructions and data for the processor 371 to perform the various functions of the user devices Dev1-DevN described herein, including logging into the server 101, presenting the received audio frames to the user, activating the microphone 374, generating and formatting audio frame data from the microphone 374, generating location and/or movement data from the GPS unit 380, selecting a channel, interfacing with the user, and generating and parsing data packets transmitted to and received from the server 101, among other appropriate functions. A voice recognition application 383 includes instructions and data for the processor 371 to recognize words spoken by the user, e.g., for voice activation of the microphone 374. A communications application 384 includes instructions and data for the processor 371 to receive/transmit and parse/generate data packets from and to the server 101. Other applications, combinations of applications, and/or variations on application functions can be used in other embodiments.

The microphone 374 represents an internal microphone or port for an external microphone through which the user speaks in order to generate the outgoing audio streams. The speaker 375 represents one or more built-in speakers or a port for external speakers or headphones through which the received computed audio frames are presented to the user.

The optional display device 376 represents a display screen on which a user interface is presented to the user for the user to view selections for configuring or controlling the user device Dev1 and, in particular, the radio simulation application 382, as described herein. The I/O interface 377 represents components for connecting to one or more optional external I/O devices 385. The internal I/O devices 378 and/or the external I/O devices 385 represent various keyboards, keypads, touch pads, pointing devices, etc. The user uses the I/O devices 378/385 and the display device 376 to interface with the user device Dev1 to configure or control its functions and, in particular, the functions of the radio simulation application 382, as described herein.

The communication interface 379 represents one or more wired or wireless components for accessing a wired or wireless access point for the communication system 102, e.g., through 3G or 4G cell phone data links, WiFi™, Bluetooth™, Zigbee™, WiMax™, Ethernet, optical cables, IEEE 1394, etc. Network data packets to and from the server 101 are transmitted and received through the communication interface 379.

The GPS unit 380 generally represents any appropriate GPS or GPS-like location devices for generating data indicative of the location of the user device Dev1. Optionally, the GPS unit 380 also represents any appropriate inertial sensors for generating data indicative of movement of the user device Dev1.

Although embodiments of the present invention have been discussed primarily with respect to specific embodiments thereof, other variations are possible. Various configurations of the described system may be used in place of, or in addition to, the configurations presented herein. For example, additional components may be included in the system where appropriate. As another example, configurations were described with general reference to certain types and combinations of system components, but other types and/or combinations of circuit components could be used in addition to or in the place of those described.

Those skilled in the art will appreciate that the foregoing description is by way of example only, and is not intended to limit the present invention. Nothing in the disclosure should indicate that the present invention is limited to systems that have the specific type of devices shown and described. Nothing in the disclosure should indicate that the present invention is limited to systems that require a particular form of integrated circuits or hardware components, except where specified. In general, any diagrams presented are only intended to indicate one possible configuration, and many variations are possible. Those skilled in the art will also appreciate that methods and systems consistent with the present invention are suitable for use in a wide range of applications.

While the specification has been described in detail with respect to specific embodiments of the present invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

The invention claimed is:

1. A method comprising:
establishing, by a server, communication with user devices, the user devices including a first user device and other user devices;
for each user device, receiving, by the server, location data identifying a location of that user device;
for each user device, determining, by the server, a geographical region based on the location of that user device, the geographical region having an area;
for each user device, determining, by the server, the other user devices that are within the geographical region of that user device;
receiving, by the server, audio streams from at least one of the other user devices that are within the geographical region of the first user device;
transmitting, by the server, the audio streams to the first user device; and
changing, by the server, a number of the other user devices that are within the geographical region of the first user device by changing the area of the geographical region based on a level of communication traffic for audio streams received from the other user devices;
wherein:
the changing of the number of the other user devices that are within the geographical region of the first user device includes at least one of: 1) decreasing, by the server, the number of the other user devices that are within the geographical region of the first user device by decreasing the area of the geographical region, and 2) increasing, by the server, the number of the other user devices that are within the geographical region of the first user device by increasing the area of the geographical region;
the decreasing of the area of the geographical region is in response to the number of the other user devices that are within the geographical region of the first user device being above a maximum threshold; and
the increasing of the area of the geographical region is in response to the number of the other user devices that are within the geographical region of the first user device being below a minimum threshold.

2. The method of claim 1, wherein changing the number of the other user devices that are within the geographical region of the first user device includes at least one of: 1) decreasing, by the server, the number of the other user devices that are within the geographical region of the first user device by decreasing the area of the geographical region, and 2) increasing, by the server, the number of the other user devices that are within the geographical region of the first user device by increasing the area of the geographical region.

3. The method of claim 2, wherein:
the decreasing of the area of the geographical region decreases a radius of the geographical region; and
the increasing of the area of the geographical region increases a radius of the geographical region.

4. The method of claim 1, further comprising:
for each user device, determining, by the server, the geographical region with that user device at a center of the geographical region.

5. The method of claim 1, further comprising:
for each user device, determining, by the server, the geographical region with boundaries based on geographical features.

6. The method of claim 1, further comprising:
for each user device, repeatedly determining, by the server, the geographical region, the geographical region changing as that user device changes location; and
repeatedly determining, by the server, a set of the other user devices that are within the geographical region of the first user device, the set of the other user devices changing as the geographical region of the first user device changes.

7. The method of claim 1, further comprising:
for each user device with a changing location, determining, by the server, a group of user devices based on i) the geographical region of that user device, and ii) a history of locations of that user device; and
transmitting, by the server, an audio stream of the first user device to the other user devices that are within the group of user devices for the first user device.

8. The method of claim 7, further comprising:
for each user device for which the history of locations indicates that it is moving, determining, by the server, the group of user devices further based on a direction of movement of that user device.

9. The method of claim 8, further comprising:
for each user device that is moving, determining, by the server, the group of user devices further based on a direction of movement of the other user devices.

10. The method of claim 8, further comprising:
for each user device that is moving, determining, by the server, the group of user devices further based on a direction of movement of the other user devices relative to the direction of movement of that user device.

11. The method of claim 8, further comprising:
for each user device that is moving, determining, by the server, the group of user devices further based on a direction of movement of that user device and of the other user devices relative to a geographical feature.

12. The method of claim 7, further comprising:
for each user device for which the history of locations indicates that it is moving, determining, by the server, the group of user devices further based on a speed of movement of that user device.

13. The method of claim 1, further comprising:
for each user device, determining, by the server, a group of user devices based on i) the geographical region of that user device, and ii) that user device and a set of the user devices travelling on a same route; and
transmitting, by the server, an audio stream of the first user device to the other user devices that are within the group of user devices for the first user device.

14. The method of claim 1, further comprising:
for each user device, determining, by the server, a group of user devices based on the geographical region of that user device, the other user devices that are within the geographical region of that user device being a subset of the other user devices, the subset of the other user devices being in the group of user devices for that user device, and that user device being in the groups of user devices for the subset of the other user devices; and for each user device, transmitting, by the server, audio streams received from that user device to the other user devices that are in the group of user devices for that user device.

15. The method of claim 1, further comprising:
transmitting, by the server, an audio stream of the first user device to the other user devices that are within the geographical region of the first user device in near real-time.

16. A method comprising:
establishing, by a server, communication with user devices, the user devices including a first user device and other user devices;
for each user device, receiving, by the server, location data identifying a location of that user device;
for each user device, determining, by the server, a geographical region based on the location of that user device, the geographical region having an area;
for each user device, determining, by the server, the other user devices that are within the geographical region of that user device;
receiving, by the server, audio streams from at least one of the other user devices that are within the geographical region of the first user device;
transmitting, by the server, the audio streams to the first user device; and
changing, by the server, a number of the other user devices that are within the geographical region of the first user device by changing the area of the geographical region;
wherein:
the changing of the number of the other user devices that are within the geographical region of the first user device includes at least one of: 1) decreasing, by the server, the number of the other user devices that are within the geographical region of the first user device by decreasing the area of the geographical region, and 2) increasing, by the server, the number of the other user devices that are within the geographical region of the first user device by increasing the area of the geographical region;
the decreasing of the area of the geographical region is in response to the number of the other user devices that are within the geographical region of the first user device being above a maximum threshold; and
the increasing of the area of the geographical region is in response to the number of the other user devices that are within the geographical region of the first user device being below a minimum threshold.

* * * * *